US010044011B2

(12) United States Patent
Peng et al.

(10) Patent No.: US 10,044,011 B2
(45) Date of Patent: Aug. 7, 2018

(54) BATTERY ACCOMMODATING ASSEMBLY AND POWER BATTERY MODULE COMPRISING THE SAME

(71) Applicant: BYD COMPANY LIMITED, Guangdong (CN)

(72) Inventors: Qingbo Peng, Guangdong (CN); Xuefeng Zhang, Guangdong (CN); Yan Zhu, Guangdong (CN); Jia Lu, Guangdong (CN); Wei Liu, Guangdong (CN); Yan Huang, Guangdong (CN); Zhipei Lu, Guangdong (CN); Jianhua Zhu, Guangdong (CN)

(73) Assignee: BYD Company Limited, Guangdong (CN)

( * ) Notice: Subject to any disclaimer, the term of this patent is extended or adjusted under 35 U.S.C. 154(b) by 161 days.

(21) Appl. No.: 15/190,007

(22) Filed: Jun. 22, 2016

(65) Prior Publication Data

US 2016/0301050 A1   Oct. 13, 2016

Related U.S. Application Data

(63) Continuation of application No. PCT/CN2014/095835, filed on Dec. 31, 2014.

(30) Foreign Application Priority Data

Dec. 31, 2013 (CN) .......................... 2013 1 0754097

(51) Int. Cl.
*H01M 2/00* (2006.01)
*H01M 2/10* (2006.01)
*H01M 2/20* (2006.01)

(52) U.S. Cl.
CPC ....... *H01M 2/1077* (2013.01); *H01M 2/1094* (2013.01); *H01M 2/206* (2013.01); *H01M 2220/20* (2013.01)

(58) Field of Classification Search
CPC ........... H01M 2/1077; H01M 2220/20; H01M 2/1094; H01M 2/206
See application file for complete search history.

(56) References Cited

U.S. PATENT DOCUMENTS

| 5,298,347 A | 3/1994 | Aksoy et al. |
| 2010/0221593 A1 | 9/2010 | Huang |
| 2011/0256446 A1 | 10/2011 | Bronczyk et al. |

(Continued)

FOREIGN PATENT DOCUMENTS

| CN | 102203996 A | 9/2011 |
| CN | 102306717 A | 1/2012 |

(Continued)

OTHER PUBLICATIONS

International Search Report and Written Opinion for PCT/CN2014/095835, dated Apr. 13, 2015, 12 pages.

*Primary Examiner* — Cynthia H Kelly
*Assistant Examiner* — Monique M Wills
(74) *Attorney, Agent, or Firm* — Sheppard, Mullin, Richter & Hampton LLP

(57) ABSTRACT

A battery accommodating assembly and a power battery module are provided. The battery accommodating assembly includes a plurality of separators. Adjacent separators are detachably connected with each other via a snapping structure and define a battery chamber.

19 Claims, 17 Drawing Sheets

(56) References Cited

U.S. PATENT DOCUMENTS

2012/0156559 A1* 6/2012 Davies ................ H01M 2/0247
            429/210
2012/0214033 A1   8/2012 Damon et al.
2013/0122339 A1* 5/2013 Chae ................... B60L 11/1879
            429/99

FOREIGN PATENT DOCUMENTS

| CN | 102655227 A | 9/2012 |
| CN | 203192921 U | 9/2013 |
| CN | 203277512 U | 11/2013 |
| JP | 2007250330 A | 9/2007 |

\* cited by examiner

BATTERY ACCOMMODATING ASSEMBLY AND POWER BATTERY MODULE COMPRISING THE SAME

CROSS REFERENCE TO RELATED APPLICATION

This application is a continuation application of International Application No. PCT/CN2014/095835, filed on Dec. 31, 2014, which is based on and claims priority and benefits of Chinese Patent Application No. 201310754097.0, filed with State Intellectual Property Office on Dec. 31, 2013. The entire contents of the above-referenced applications are incorporated herein by reference.

FIELD

Embodiments of the present disclosure generally relate to a battery field, and more particularly, to a battery accommodating assembly and a power battery module comprising the same.

BACKGROUND

In the related art, most of the power battery modules adopt a battery accommodating assembly with a multi-plate structure or an upper-lower housing structure. Although these structures can protect the battery well, a combination mode of the batteries cannot be expanded and developed freely due to the limitations of the multi-plate structure and the upper-lower housing structure. When the combination mode of the batteries is needed to be changed, it is necessary to redesign and redevelop a new combination manner of the batteries, such that it will waste a lot of time and greatly increase the cost. Also, the battery accommodating assemblies with the multi-plate and upper-lower housing structures are not suitable to an automatic production of the power battery module, thus increasing the cost of the power battery module.

SUMMARY

Embodiments of the present disclosure seek to solve at least one of the problems existing in the related art to at least some extent.

Accordingly, embodiments of a first broad aspect of the present disclosure provide a battery accommodating assembly. The battery accommodating assembly includes a plurality of separators. Adjacent separators are detachably connected with each other via a snapping structure and define a battery chamber.

With the adjacent separators defining the battery chamber to accommodate the battery and the plurality of separators connected with one another detachably, the power battery module according to embodiments of the present disclosure can freely expand a number of batteries and be adapted to different connection manners of the batteries (such as a series connection, a parallel connection and a series-parallel connection) according to an actual requirement. In addition, the adjacent separators of the battery accommodating assembly are detachably connected with each other via a snapping structure, such that it is convenient to assemble and disassemble the battery accommodating assembly, and the assembly process is simplified and the assembly efficiency is improved. Furthermore, for the power battery module, an expansibility thereof is improved, a development cost thereof is reduced and a development period thereof is shortened.

Embodiments of a second broad aspect of the present disclosure provide power battery module. The power battery module includes: a battery accommodating assembly mention above, and a battery accommodated in the battery chamber. With the power battery module, an expansibility of power battery module is improved, a development cost of power battery module is reduced and a development period of power battery module is shortened Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
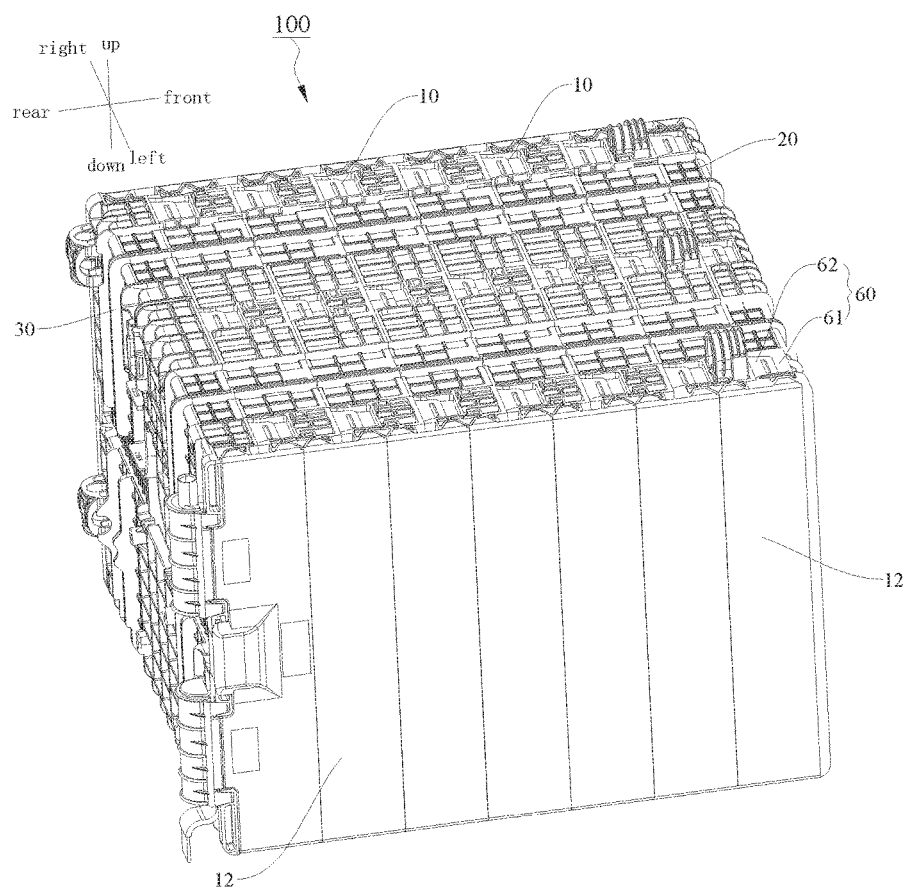
FIG. 1 is a schematic view of an assembled power battery module according to an embodiment of the present disclosure.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom", "inner", "outer", "clockwise", "anticlockwise" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, "a plurality of" relates to two or more than two.

In the description of the present disclosure, unless specified or limited otherwise, it should be noted that, terms "mounted," "connected" "coupled" and "fastened" may be understood broadly, such as permanent connection or detachable connection, electronic connection or mechanical connection, direct connection or indirect connection via intermediary, inner communication or interaction between two elements. These having ordinary skills in the art should understand the specific meanings in the present disclosure according to specific situations.

In the description of the present disclosure, a structure in which a first feature is "on" a second feature may include an embodiment in which the first feature directly contacts the second feature, and may also include an embodiment in which an additional feature is formed between the first feature and the second feature so that the first feature does not directly contact the second feature, unless otherwise specified. Furthermore, a first feature "on," "above," or "on top of" a second feature may include an embodiment in which the first feature is right "on," "above," or "on top of" the second feature, and may also include an embodiment in which the first feature is not right "on," "above," or "on top of" the second feature, or just means that the first feature has a sea level elevation larger than the sea level elevation of the second feature. While first feature "beneath," "below," or "on bottom of" a second feature may include an embodiment in which the first feature is right "beneath," "below," or "on bottom of" the second feature, and may also include an embodiment in which the first feature is not right "beneath," "below," or "on bottom of" the second feature, or just means that the first feature has a sea level elevation smaller than the sea level elevation of the second feature.

Figure 3:
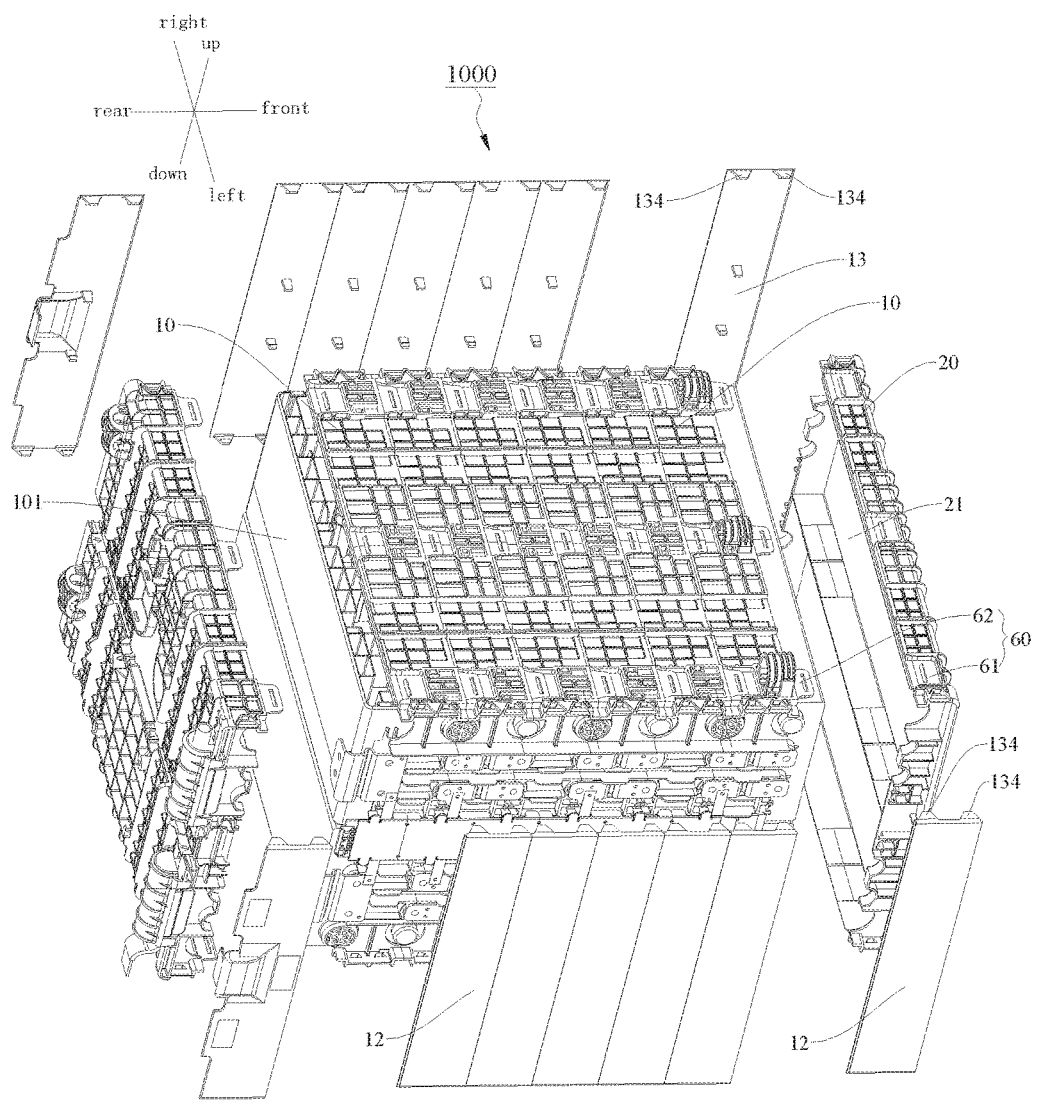
FIG. 3 is a schematic view showing an assembling relationship between a battery accommodating assembly and a battery shown in FIG. 1.
Figure 9:
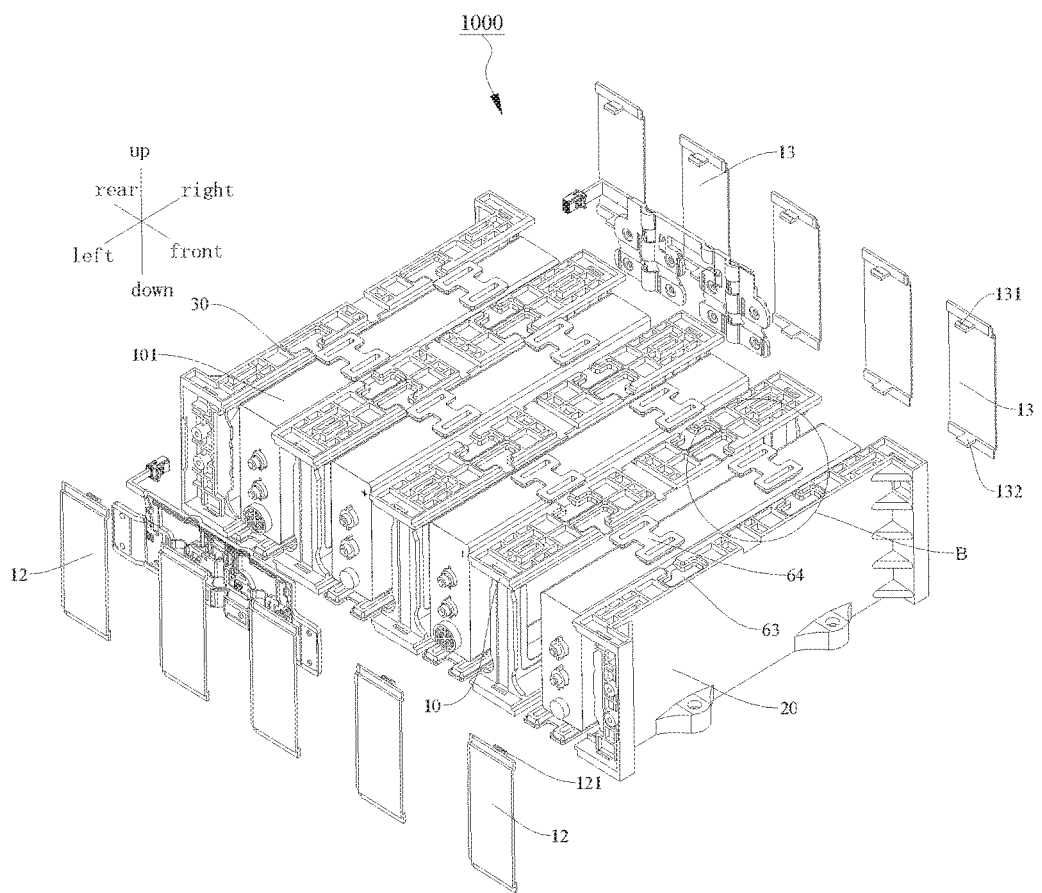
FIG. 9 is a schematic view showing an assembling relationship between a battery accommodating assembly and a battery according to a further embodiment of the present disclosure.

A power battery module 1000 serves as a power source of an electric vehicle, such that the performance and safety thereof become significant factors for the whole electric vehicle. The power battery module 1000 may include a battery accommodating assembly 100 and a battery 101, in other words, the battery 101 is mounted in the battery accommodating assembly 100 so as to form the power battery module 1000, FIG. 3 and FIG. 9 are schematic view showing an assembling relationship between a battery accommodating assembly 100 and a battery 101.

The battery accommodating assembly 100 according to embodiments of the present disclosure will be described in the following with reference to FIGS. 1-19.

As shown in FIGS. 1-12, the battery accommodating assembly 100 according to embodiments of the present disclosure has a plurality of separators 10, and adjacent separators 10 are detachably connected with each other via a snapping structure 60 and define a battery chamber configured to accommodate the battery 101.

In some embodiments of the present disclosure, the plurality of separators 10 is disposed parallel with each other in a rear-front direction. Specifically, the adjacent separators 10 are connected with each other via the snapping structure 60, and the adjacent separators 10 are detachable with each other.

Since the adjacent separators 10 are detachably connected with each other via the snapping structure 60, any number of separators 10 can be connected together according to an actual requirement, such that any number of batteries 101 can be adopted to satisfy requirements of the power battery modules 1000 having different parameters, i.e. the power battery module 1000 can be freely expanded and developed according to the actual requirement. For example, a capability of accommodating the battery 101 of the power accommodating assembly 100 can be improved by increasing a number of the separators 10. In other words, by increasing the number of the separators 10, a number of the battery chambers in the power battery module 1000 can also be increased, so that more accommodating space can be provided for the additional batteries 101 in the power battery module 1000.

Accordingly, with the adjacent separators 10 defining the battery chamber configured to accommodate the battery 101 and connected with each other detachably, the power battery module 1000 according to embodiments of the present disclosure can freely expand the number of the batteries 101 and be adapted to different connection manners of the batteries (such as a series connection, a parallel connection and a series-parallel connection of the batteries 101) according to an actual requirement. In addition, the adjacent separators 10 of the battery accommodating assembly 100 are detachably connected with each other via the snapping structure 60, such that it is convenient to assemble and disassemble the battery accommodating assembly 100, and the assembly process is simplified and the assembly efficiency is improved. Furthermore, for the power battery module 1000, an expansibility thereof is improved, a development cost thereof is reduced and a development period thereof is shortened.

The snapping structure 60 according to embodiments of the present disclosure will be described with reference to FIGS. 1-6.

As shown in FIGS. 1-6, the snapping structure includes a snapping groove 61 formed in one of the adjacent separators 10 and a snapping tongue 62 disposed on the other of the adjacent separators 10 and adapted to snap in the snapping groove 61 to fasten the adjacent separators 10 together. In other words, the snapping structure 60 may include the snapping tongue 62 and the snapping groove 61, the snapping tongue 62 is disposed on one of the adjacent separators 10, and the snapping groove 61 is formed in the other of the adjacent separators 10 and is cooperated with the snapping tongue 62 to fasten the adjacent separators 10 together.

Moreover, a positioning hole 621 may be formed in the snapping tongue 62, and a positioning boss 612 may be disposed on a bottom wall of the snapping groove 61 and is fitted into the positioning hole 621. Specifically, the positioning boss 612 extends upward into the positioning hole 621, i.e. the snapping tongue 62 is snapped in the snapping groove 61, such that the adjacent separators 10 can be connected with each other. Therefore, the adjacent separators 10 have a simple structure and are easy to connect with each other, thus providing the high expansibility. Moreover, the snapping tongue 62 and the snapping groove 61 also have a function of positioning for the plurality of separators 10, thus facilitating the positioning between the adjacent separators 10 and improving the assembling speed.

Figure 4:
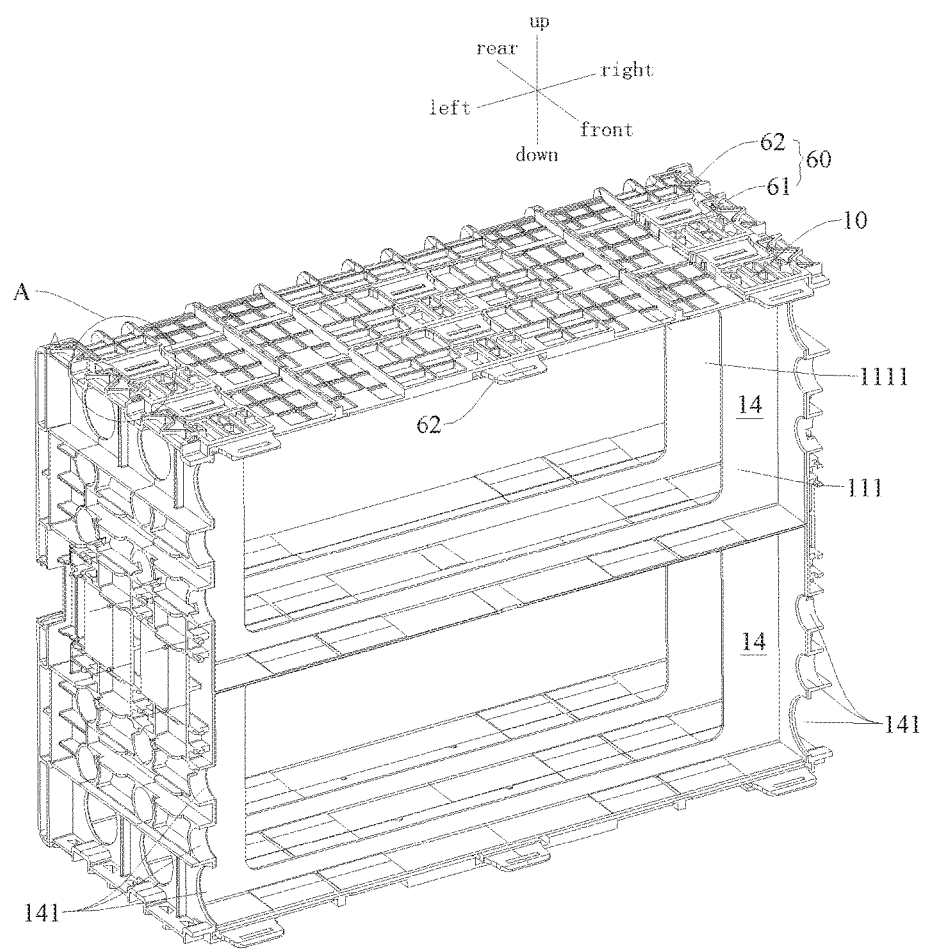
FIG. 4 is a schematic view showing an assembling relationship between the separators of a power battery module shown in FIG. 1.
Figure 5:
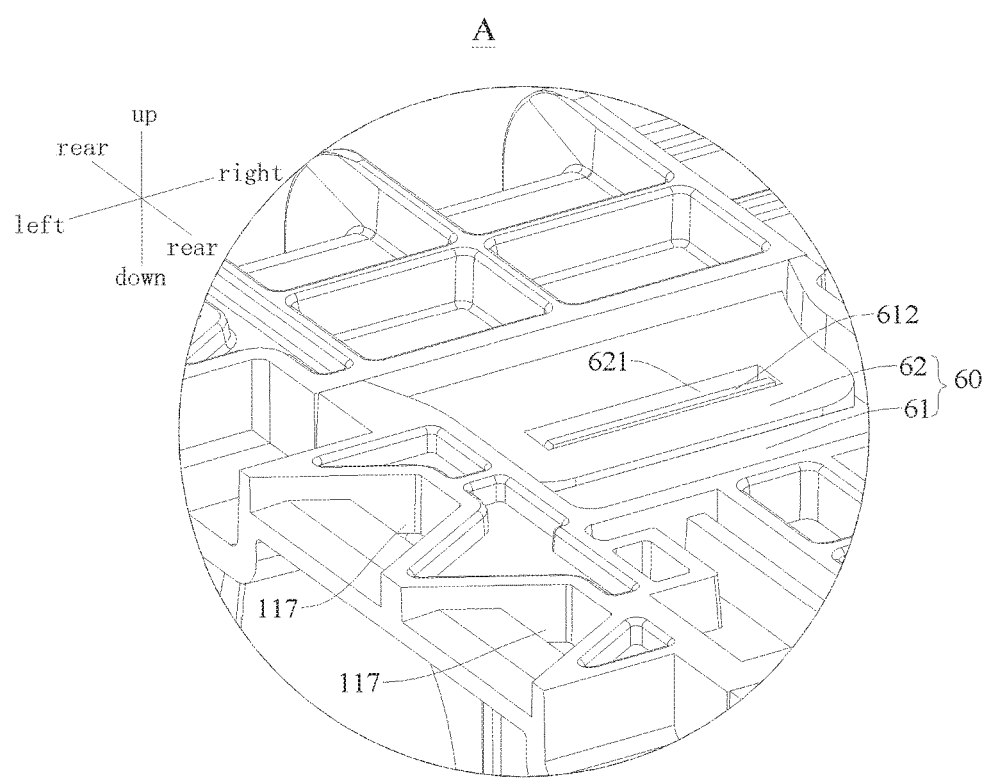
FIG. 5 is an enlarged view of region A in FIG. 4.
Figure 6:
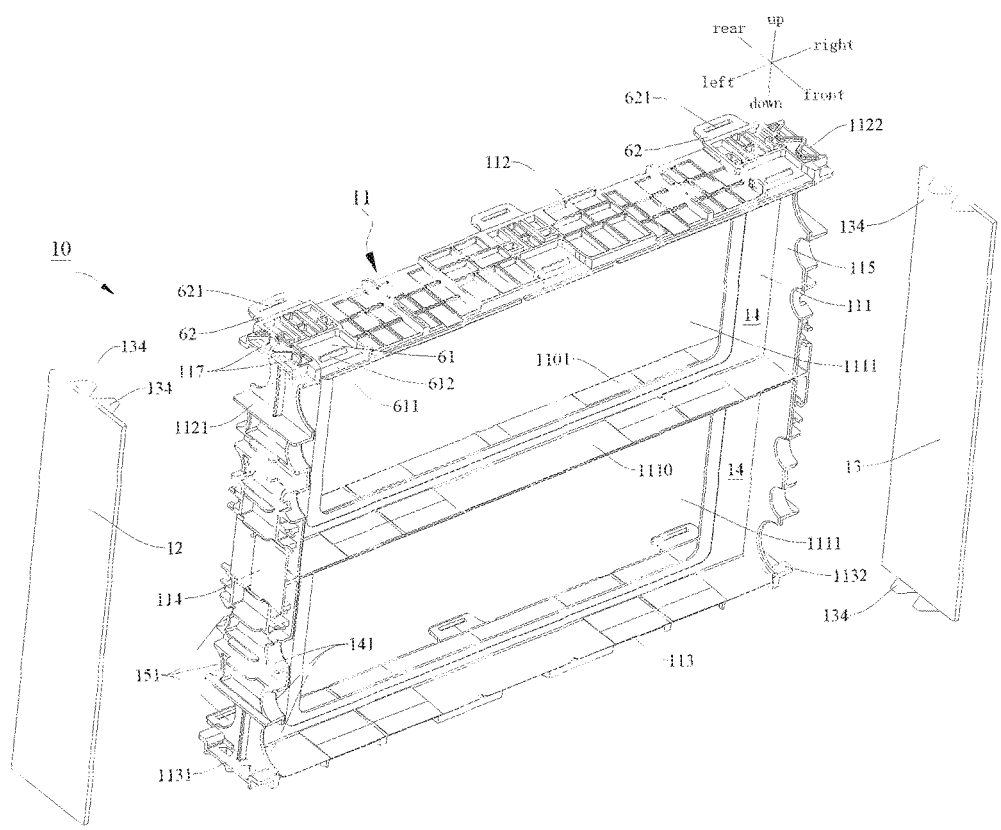
FIG. 6 is a perspective view of a separator of the power battery module as shown in FIG. 1.
Figure 7:
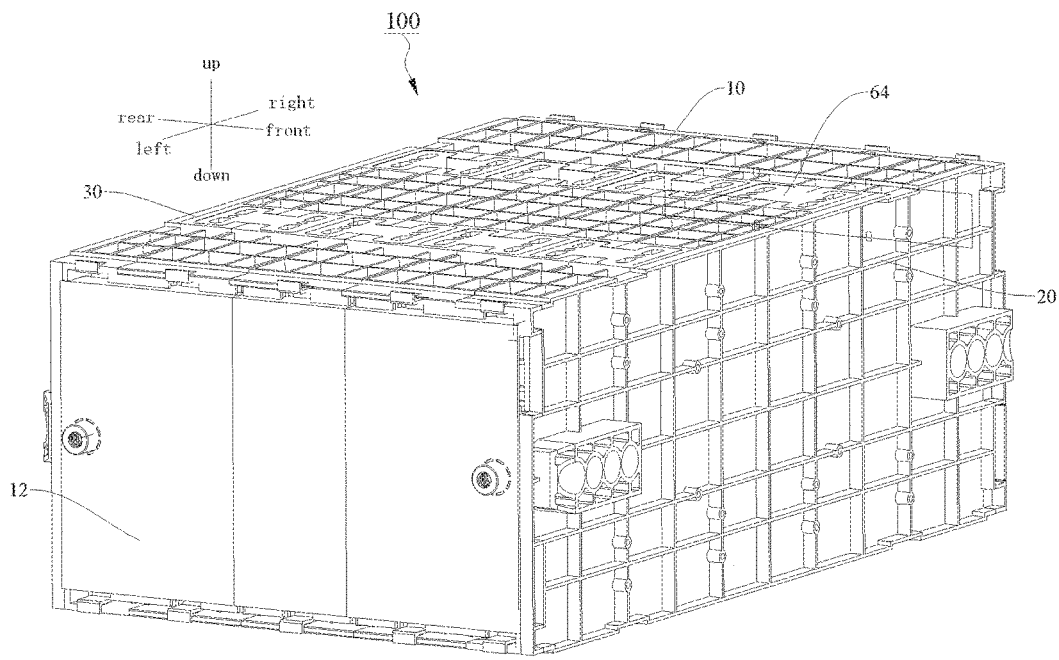
FIG. 7 is a schematic view of a power battery module according to another embodiment of the present disclosure.
Figure 8:
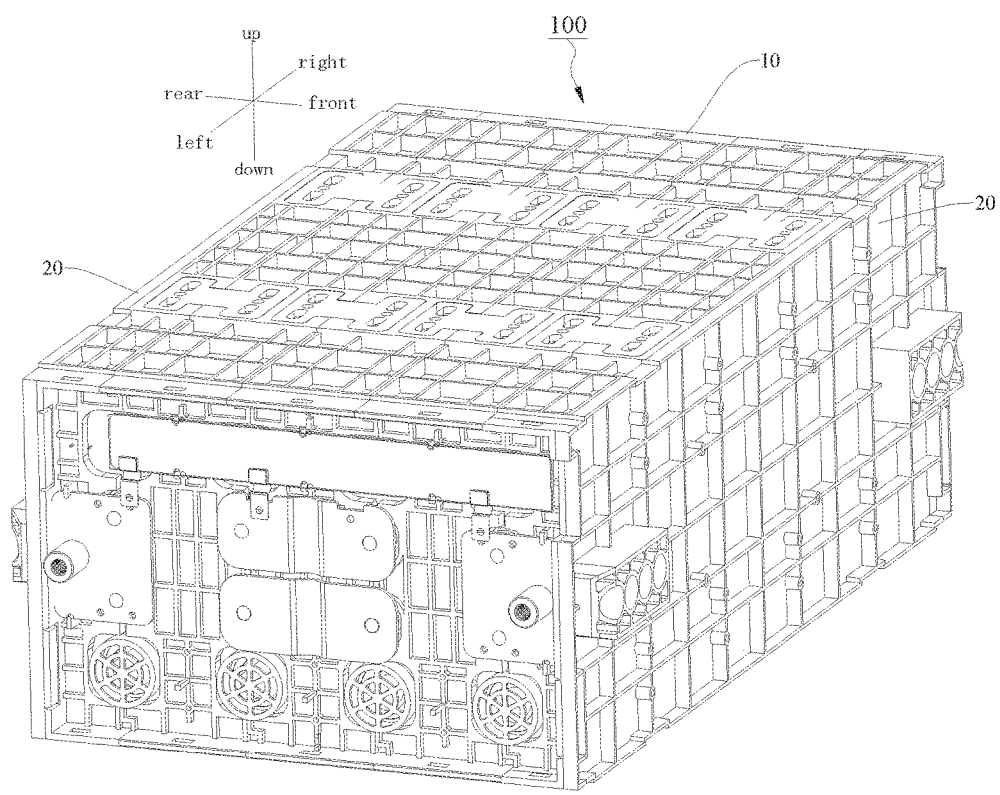
FIG. 8 is a schematic view of the power battery module as shown in FIG. 7 without left and right covers.

As shown in FIGS. 4-6, the separator 10 includes the upper frame plate 112. The upper frame plate 112 is disposed at a top of the separator 10. The snapping groove 61 is formed in one of front and rear edges of the upper frame plate 112, and the snapping tongue 62 is disposed on the other of the front and rear edges of the upper frame plate 112. In other words, each of the separators 10 has both of the snapping groove 61 and the snapping tongue 62, such that when the plurality of separators 10 are arranged in a row, the plurality of separators 10 can be snapped with an another one by one.

Alternatively, the separator 10 includes the lower frame plate 113. The lower frame plate 113 is disposed at a bottom of the separator 10. The snapping groove 61 is formed in one of front and rear edges of the lower frame plate 113, and the snapping tongue 62 is disposed on the other one of the front and rear edges of the lower frame plate 113. In other words, the snapping structure 60 may be disposed on both of the upper frame plate 112 and the lower frame plate 113 of each of the separators 10. Further, the snapping structure 60 may be merely disposed on the upper frame plate 112, or the snapping structure 60 may be merely disposed on the lower frame plate 113 or the snapping structure 60 may be disposed on both of the upper frame plate 112 and the lower frame plate 113.

In an embodiment of the present disclosure, the snapping structure 60 is disposed on both of the upper frame plate 112 and the lower frame plate 113, such that upper portions of the adjacent separators 10 are connected with each other and lower portions of the adjacent separators are also connected with each other, and thus a connection strength and a connection stability between the adjacent separators 10 are improved. Furthermore, the battery accommodating assembly 100 protects the battery 101 more reliably.

A plurality of the snapping tongues 62 and the snapping grooves 62 may be disposed on the upper frame plate 112 of the separator 10 and the snapping tongues 62 may be one to one correspondence with the snapping groove 62. A plurality of the snapping tongues 62 and the snapping grooves 62 are disposed on the lower frame plate 113 of the separator 10 and the snapping tongue 62 may be one to one correspondence with the snapping groove 62. Thereby, the connection strength and the connection stability between the adjacent separators 10 are further improved.

In an embodiment of the present disclosure as shown in FIG. 5, the snapping tongue 62 is configured to have a trapezoid shape, i.e. a projection of the snapping tongue 62 in the up-down direction is a trapezoid. Correspondingly, the snapping groove 61 may be configured as a trapezoid fitted with the snapping tongue, such that the snapping tongue 62 has a sufficient structure strength. Certainly, the present disclosure is not limited to this, and the snapping tongue 62 and the snapping groove 61 may have any other shapes as long as the snapping tongue 62 can be snapped in the snapping groove 61 stably.

As shown in FIG. 6, a guiding slope 611 may be formed at an opening of the snapping groove 61, and the guiding slope 611 is configured to be inclined downward from an inner end of snapping groove 612 to the opening thereof. When the battery accommodating assembly 100 is assembled, the guiding slope 611 performs a guiding function on mounting the snapping tongue 62, i.e. the snapping tongue 62 is guided to insert into the snapping groove easily via the guiding slope 611, thus improving the assembling speed and reducing a assembling difficulty.

The snapping structure 60 according to another embodiment of the present disclosure will be described in the following with reference to FIGS. 7-14.

As shown in FIGS. 7-14, the snapping structure 60 may include a snap-fit groove 63 and a snap-fit pin 64. The snap-fit groove 63 is formed in the separator 10 and the snap-fit pin 64 is configured as a detachable member with respect to the separator 10 and includes at least two mounting parts 641. The at least two mounting parts 641 are snapped in the snap-fit grooves 63 of at least two separators 10 so as to connect the at least two separators 10 with each other. In other words, the snap-fit pin 64 can connect the at least two adjacent or non-adjacent separators 10 with each other. By disposing the snap-fit pin 64, it is convenient to connect the separators 10 together, and it is easy to assemble the separators rapidly and various assembly manners are provided.

Figure 10:
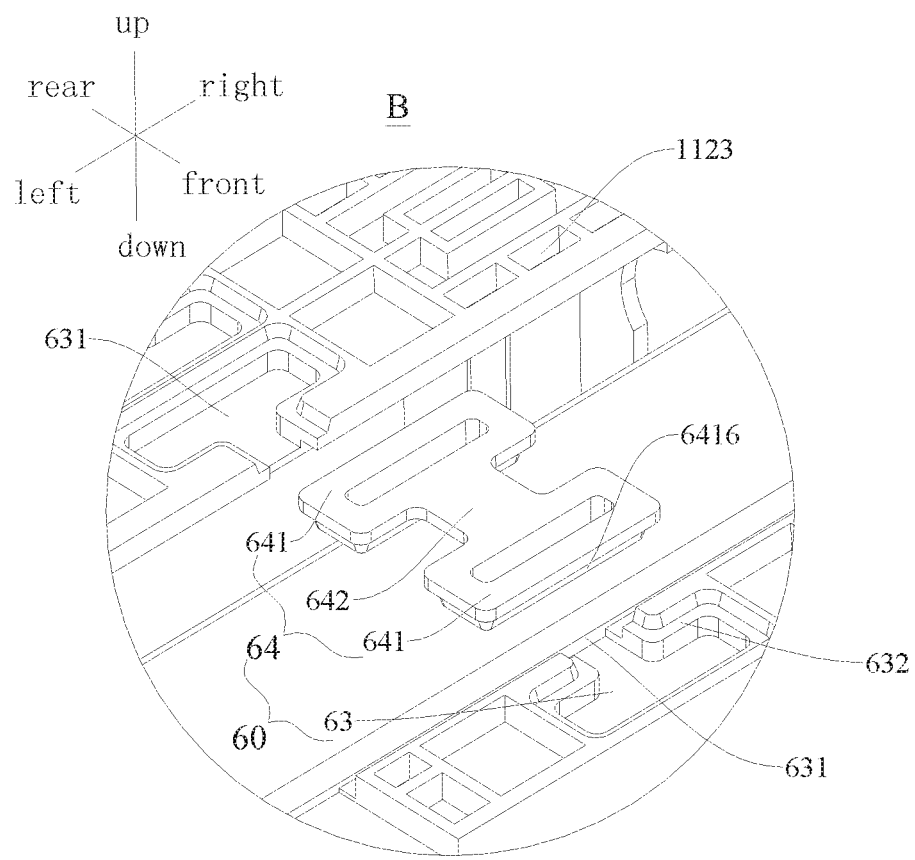
FIG. 10 is an enlarged view of region B shown in FIG. 9.
Figure 13:
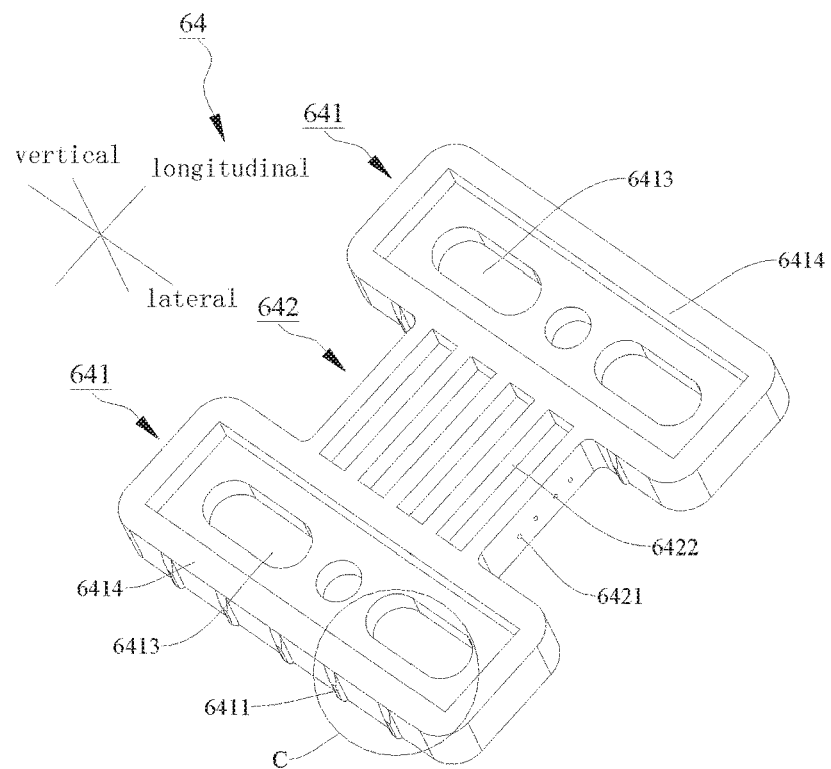
FIG. 13 is a perspective view of a snap-fit pin of the power battery module shown in FIG. 9.

As shown in FIGS. 10 and 13, in some embodiments of the present disclosure, the snap-fit pin 64 may further include a connecting bridge 642. Two mounting parts 641 are disposed at two ends of the connection bridge 642 respectively and are fitted in the snap-fit grooves 63 of adjacent separators 10 to connect the adjacent separators 10 with each other. In other words, the snap-fit pin 64 may merely connect the adjacent separators 10 with each other, such that the snap-fit pin 64 may have a relative small volume and a simple structure. Therefore, a connecting structure between separators 10 of the battery accommodating assembly 100 is simple and it is convenient to assembly the separators 10. By using the snap-fit pin 64 to connect the separators 10 with each other, the power battery module 1000 can include any number of separators 10 according to the actual requirement of the batteries, thus improving the extendibility of the power battery module 1000.

The snap-fit grooves 63 has an opening 631, and the openings 631 of the snap-fit grooves 63 in the adjacent separators 10 are aligned to each other so as to form a groove to receive the connecting bridge 642. Thereby, when the snap-fit pin 64 is disposed between the separators 10, an upper surface of the snap-fit pin 64 is flush with an upper surface of the separator 10, such that the appearance of the battery accommodating assembly 100 is aesthetic and the snap-fit pin 64 is completely embedded into the snap-fit groove 63, thus avoiding a damage on the snap-fit pin 64 due to an external force.

In some embodiments of the present disclosure, the snap-fit groove 63 may be formed in each of the upper frame plates 112 of the adjacent separators 10 and the snap-fit pin 64 may be disposed between the upper frame plates 112 of the adjacent separators 10 to connect the adjacent separators 10 with each other.

Alternatively, the snap-fit groove 63 may be formed in each of the lower frame plates 113 of the adjacent separators 10 and the snap-fit pin 64 may be disposed between the lower frame plates 113 of the adjacent separators 10 to connect the adjacent separators 10 with each other.

In an embodiment of the present disclosure, the snap-fit pin 64 may be merely disposed between the upper frame plates 112 of the adjacent separators 10 or between the lower frame plates 112 of the adjacent separators 10. Alternatively, the snap-fit pins 64 may be disposed between the upper frame plates 112 of the adjacent separators 10 and between the lower frame plates 113 of the adjacent separators 10 synchronously. Therefore, the various connection manners between the separators 10 are provided so as to meet various mounting requirements of the battery accommodating assembly 100.

In an embodiment of the present disclosure, the snap-fit pins 64 are disposed between the upper frame plates 112 of the adjacent separators 10 and between the lower frame plates 113 of the adjacent separators 10 synchronously, such that the upper portions of the adjacent separators 10 are connected with each other and the lower portions of the adjacent separators 10 are connected with each other, and the structure of the battery accommodating assembly 100 is stable, thus providing a more reliable protection of the battery accommodating assembly 100 for the battery 101 and the better safety performance for the power battery module 1000.

Alternatively, the mounting part 641 may have an interference fit with the snap-fit groove 63, or the mounting part 641 may be fitted in the snap-fit groove 63 via a bolt, such that the snap-fit pin 64 can be connected with the separator 10 closely, thus providing the high reliability and high connection strength and improving the working life of the power battery module 1000.

Alternatively, the mounting part 641 may be configured as a circular, a trapezoid or a rectangle shape. In other words, a projection of the mounting part 641 in the up-down direction may be a circular, a trapezoid or a rectangle. Correspondingly, the snap-fit groove 63 is also configured as a circular, a trapezoid or a rectangle matched with the mounting part 641. Therefore, the structure of the mounting part 641 is various and it is convenient to assemble the mounting part 641 onto the separator 10.

In an embodiment of the present disclosure, a step part 6416 is formed on a surface of the mounting part 641 facing the snap-fit groove 63, and a step part 632 corresponding to step part 6416 of the mounting part 641 is formed on the snap-fit groove 63, such that the mounting part 641 can be fitted in the snap-fit groove 63 more closely, and the snapping structure 60 is more stable and the structure stability of the battery accommodating assembly 100 is further improved.

Figure 14:
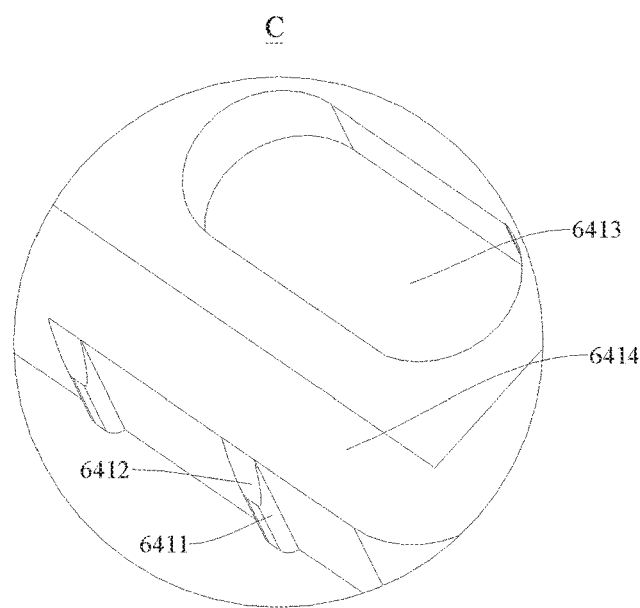
FIG. 14 is an enlarged view of region C shown in FIG. 13.

As shown in FIGS. 13 and 14, the connecting bridge 642 extends in a longitudinal direction and two mounting parts 641 are disposed at two ends of the connecting bridge 642 in the longitudinal direction and are vertical to the longitudinal direction, i.e. the mounting part 641 extends in a lateral direction. In other words, the snap-fit pin 64 is configured as a substantial "⊥" shape. A plurality of protruded ridges 6411 extending in a thickness direction of the connection bridge 642 are disposed on an outer end surface of the mounting part 641 away from the connecting bridge 642, i.e. the protruded ridge 6411 extends in a vertical direction. When the snap-fit pin 64 is being mounted into the separator 10, the mounting part 641 is fitted with the snap-fit groove 63 and the protruded ridge 6411 disposed on the outer end surface of the mounting part 641 performs a positioning and guiding function, such that it facilitates to mount the snap-fit pin 64. Moreover, a friction force may be generated between the protruded ridge 6411 and a wall of the snap-fit groove 63 so as to hold the snap-fit pin 64 during a whole service time of the snap-fit pin 64.

In some embodiments of the present disclosure, a cross-section of the protruded ridge 6411 is configured as an arc shape. Alternatively, one end of the protruded ridge 6411 has a slope 6412 inclined toward the other end of the protruded ridge 6411, i.e. as shown in FIG. 14, one end (for example an upper end) of the protruded ridge 6411 in the vertical direction has the slope 6412 inclined toward the other end (for example an lower end) of the protruded ridge 6411 in the vertical direction. Alternatively, a cross-section of the other end (for example the lower end) of the protruded ridge 6411 may be configured as circle. Thereby, it is convenient to assemble a product during usage, and a force in the longitudinal direction may be generated between the protruded ridge 6411 and the wall of the snap-fit groove 63, such that it is hard for the snap-fit pin 64 to have a deformation to get out of the snap-fit groove 63. Certainly, in an embodiment of the present disclosure, the protruded ridge 6411 may be disposed at each of two opposing end surfaces of the mounting part 641, such that the friction force between the protruded ridge 6411 and the wall of the snap-fit groove 63 can be further improved, thus further increasing the connection strength of the snap-fit pin 64.

In an embodiment of the present disclosure, at least one of the two mounting parts 641 has at least one dismounting hole 6413 penetrating the mounting part 641 in the thickness direction thereof. When mounting or dismounting the snap-fit pin 64, an operator can hold the snap-fit pin 64 via the dismounting hole 6413 to mount or dismount, such that it is easy and convenient to mount or dismount the snap-fit pin 64 rapidly. Alternatively, a mounting member such as a mounting boss or a mounting pin (not shown), fitted with the dismounting hole 6413, may be disposed on a bottom wall of the snap-fit groove 63, such that the snap-fit pin 64 can be fixed on the separator 10 more stably. One or a plurality of dismounting holes 6413 may be provided according to the actual assembling requirement.

As shown in FIGS. 13 and 14, the mounting part 641 has a base stand 6414 extending outward in the thickness thereof. In other words, the base stand 6414 extends in the longitudinal direction and a surface of the base stand 6414 is higher than a surface of the corresponding mounting part 641. The base stand 6414 is formed at peripheries of the corresponding mounting part 641. By disposing the base stand 6414, the structure strength of the mounting part 641 can be increased, and the strength of the snap-fit pin 64 can also be improved. Furthermore, the mounting part 641 is difficult to deform and the connection strength of snap-fit pin 64 between the separators 10 is improved.

Alternatively, an extended thickness of the base stand 6414 may be 1 to 10 mm. In an embodiment of the present disclosure, the extended thickness of the base stand is 1 to 3 mm, thus, the base stand 6414 has a proper thickness, and the material of the base stand 6414 can be saved.

Alternatively, at least one strengthening rib 6422 is formed in the surface of the connecting bridge 642. By disposing the strengthening rib 6422, the structure strength of the connecting bridge is strengthened and the connecting bridge 642 is not easy to deform, thus increasing the working life of the snap-fit pin 64.

In some embodiments of the present disclosure, as shown in FIG. 13, a plurality of bosses 6421 are disposed on at least one of two side surfaces of the connecting bridge 642 in the lateral direction and are protruded outward from the corresponding side surface. By disposing the plurality of bosses

6421, the friction force between the snap-fit pin 64 and the wall of the snap-fir groove 63 is increased, thus further improving the connection strength between the snap-fit pin 64 and separator 10.

Alternatively, each of the plurality of bosses 6421 is configured as a substantial semisphere, such that it is convenient for a demolding thereof during an injection molding of the snap-fit pin 64. If a size of the boss 6421 is too small, the friction force between the snap-fit pin 64 and the wall of the snap-fit groove 63 is not enough; if the size of the boss 6421 is too large, it is difficult for the demolding of the snap-fit 64. Preferably, a diameter of the boss 6421 is from 1 mm to 2 mm, i.e. a diameter of a connecting part of the boss 6421 and the connecting bridge 642 may be from 1 mm to 2 mm, thus ensuring the friction force between the snap-fit pin 64 and the wall of the snap-fit groove 63 and facilitating the demolding of the snap-fit pin 64. The plurality of bosses 6421 are spaced apart from each other in the longitudinal direction, such that the friction force between the snap-fit pin 64 and the wall of the snap-fit groove 63 is uniform.

Considering the connection strength of the snap-fit pin 64 and the cooperation between the snap-fit 64 and the separator 10, a thickness of the whole snap-fit pin 64 may be from 8 mm to 15 mm. In an embodiment of the present disclosure, the thickness of the whole snap-fit pin 64 is from 10 mm to 13 mm, i.e. a thickness of a projection of the snap-fit 64 in the up-down direction is from 10 mm to 13 mm. Thereby, the snap-fit pin 64 has the enough structure strength and saves material, and it is convenient and reliable to connect the snap-fit pin 64 with the separator 10.

Alternatively, the snap-fit pin 64 is a plastic molding part or a plastic-metal mixed molding part. For example, the connecting bridge 642, the mounting part 641, the protruded ridge 6411, the boss 6421 and the base stand 6414 are plastic parts and are formed integrally by the injection molding, and it is easy and convenient to form these plastic parts. The connecting bridge 642, the mounting part 641, the protruded ridge 6411, the boss 6421 and the base stand 6414 may be made of PPO (Poly Phenylene Oxide), PP (Poly Propylene), PPE (Poly Phenyl Ether) or these materials embedded with metal therein. Thereby, these components have the high strength, the high corrosion resistance, the great weather fastness, the good fire resistance and the high insulation property which meet the requirement of safety performance and reliability, and thus the snap-fit pin 64 has the high structure strength.

In some embodiments of the present disclosure, a through hole may be formed in at least one of left and right walls of the battery chamber. The through hole serves as an exit for an electrode passing through the battery chamber, and positive and negative electrodes of the battery 101 can extend out via the through hole so as to facilitate a connection between the batteries 101. Or the through hole may serve as a positioning hole 621 of an anti-explosion valve or an injection hole (an anti-explosion liquid may be injected into the battery chamber via the injection hole), i.e. a function of the through hole can be determined according to the actual requirement so as to facilitate a function development of the power battery module 1000.

Alternatively, two notches opposed to each other may be formed in adjacent separators 10 respectively and the two notches define the through hole. In an embodiment of the present disclosure, a cross-section of the through hole may be a circular, an ellipse, a polygon or an irregular shape.

Alternatively, a plurality of through holes are arranged and spaced from one another in an up-down direction, i.e. a plurality of the notches may be formed in one separator 10 and spaced from one another in the up-down direction.

Figure 11:
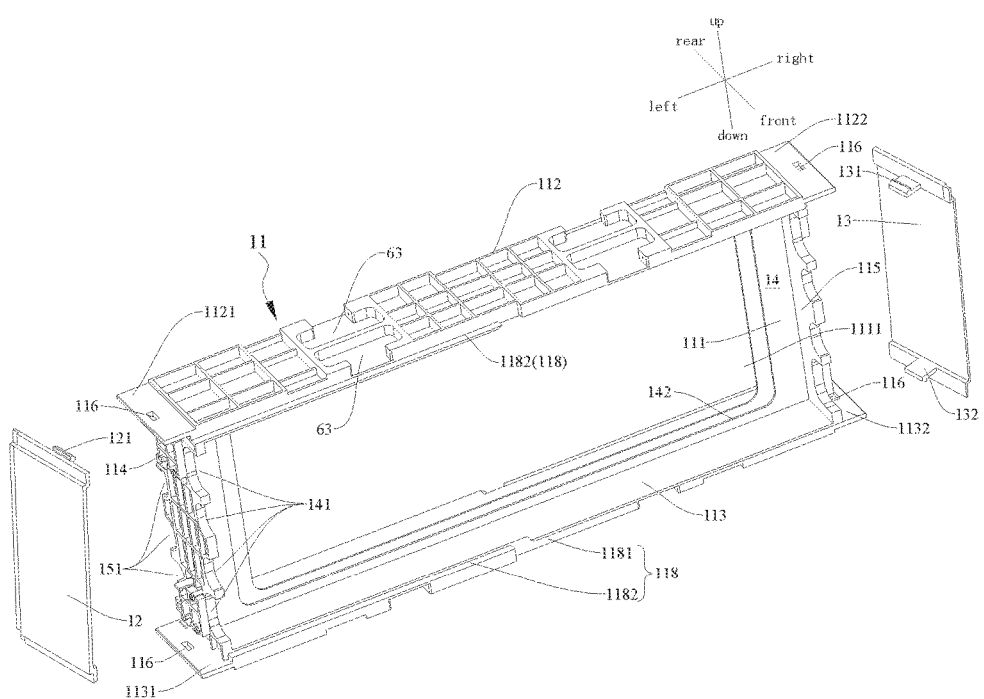
FIG. 11 is a perspective view of a separator in the power battery module as shown in FIG. 9.
Figure 12:
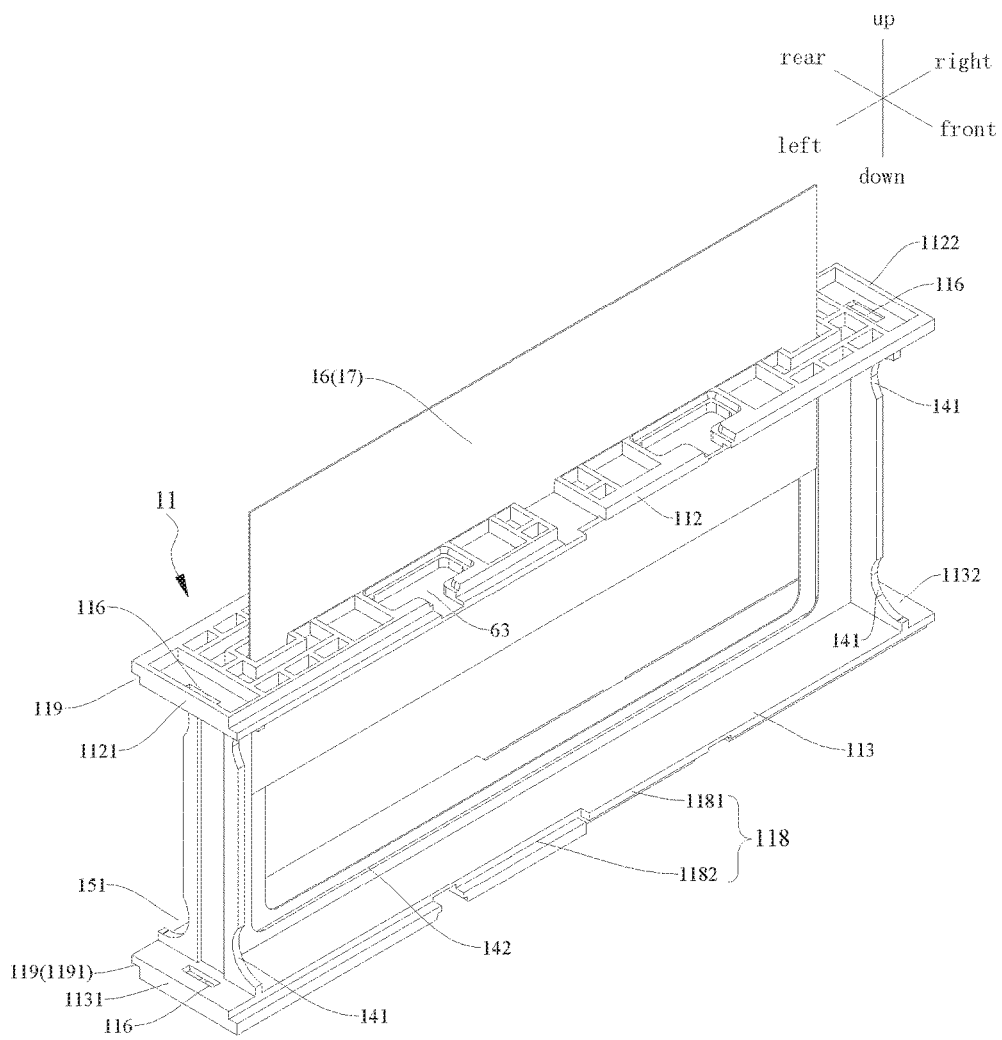
FIG. 12 is a schematic view showing a assembling relationship between a separator and an insulating plate or a heat conducting plate of the battery accommodating assembly shown in FIG. 9.

As shown in FIG. 6, FIG. 11 and FIG. 12, the separator 10 includes a separator body 11 having a front portion and a rear portion, the front portion defines a front accommodating groove 14. Specifically, the front accommodating groove 14 is configured to extend backward from the front portion of the separator body 11. A front notch 141 is formed in at least one of left and right walls of the front accommodating groove 14, and the front accommodating groove 14 of one of the adjacent separators 10 and the rear portion of the separator body 11 of the other of adjacent separators 10 define the battery chamber. And the front notch 141 of one of the adjacent separators 10 and the rear portion of the separator body 11 of the other of adjacent separators 10 define the through hole. In other words, an accommodating groove of the battery 101 is merely formed in the front portion of each separator 10, and the front accommodating groove 14 and the rear portion of the adjacent separator 10 define the battery chamber to accommodate the battery 101. Thereby, the separator 10 has a simpler structure and is easily to be manufactured.

In some embodiments, the rear portion of each separator may define a rear accommodating groove, and a rear notch 151 corresponding to the front notch 141 may be formed in at least one of left and right walls of the rear accommodating groove. The battery chamber may be defined by the front accommodating groove 14 of one of the adjacent separators 10 and the rear accommodating groove of the other of the adjacent separators 10, and the through-hole may be defined by the front notch 141 of one of the adjacent separators 10 and the rear notch 151 of the other of the adjacent separators 10. Therefore, the battery chamber is defined by the front accommodating groove 14 and the rear accommodating groove to have more space for accommodating the battery 101. Structures of the front and rear portions of each separator 10 may be identical with each other, such that the separator can have a symmetrical structure.

Alternatively, the front notch 141 and the rear notch 151 may be configured as a semicircle, and thus the through hole defined by the front notch 141 and the rear notch 151 can have a circular cross-section. In an embodiment of the present disclosure, each of the plurality of separators 10 may have a same structure, such that the plurality of separators 10 can be manufactured by a same set of mold, thus saving the cost and facilitating the assembling and quantity production of the power battery module 1000.

As shown in FIGS. 4 and 6, each of the separators 10 includes two front accommodating grooves 14 arranged along the up-down direction and two rear accommodating grooves arranged along the up-down direction and in one to one correspondence with the front accommodating grooves 14. The two front accommodating grooves 14 are separated from each other by a front separating plate 1110, and the two rear accommodating grooves are separated from each other by a rear separating plate 1101. Therefore, two battery chambers are formed between the two separators 10 to accommodate two batteries 101, thus further improving the capability of the battery accommodating assembly 100 to accommodate the battery 101 and the structure of the power battery module 1000 is compact. It can be understood by those skilled in the related art that the two battery chambers formed between the two adjacent separators 10 and spaced from each other in the up-down direction are just exemplary, and not limited. In other words, more battery chambers may be formed between adjacent separators, such as three or more than three, and thus more batteries 101 can be disposed in the battery accommodating assembly 100, such that the power battery module 1000 is easy to be used and has a high expansibility. In an embodiment of the present disclosure, the front separating plate 1110 and rear separating plate 1101 corresponding to each other are formed integrally.

As shown in FIGS. 6, 11 and 12, the separator 11 includes a vertical plate 111, an upper frame plate 112, a lower frame plate 113, a left plate 114 and a right plate 115. The upper frame plate 112 is disposed at a top edge of the vertical plate 111, the lower frame plate is disposed at a bottom edge of the vertical plate 111, the left plate 114 is disposed at a left end of the vertical plate 111 and includes an upper end connected with the upper frame plate 112 and a lower end connected with the lower frame plate 113, and the right plate 115 is disposed at a right end of the vertical plate 111 and includes an upper end connected with the upper frame plate 112 and a lower end connected with the lower frame plate 113.

Each of the front accommodating groove 14 and the rear accommodating groove is defined by the vertical plate 111, the upper frame plate 112, the lower frame plate 113, the left plate 114 and the right plate 115. Thereby, the separator body 11 has a simple structure and is easy to manufacture. In an embodiment of the present disclosure, the separator 10 may be formed integrally, i.e. the vertical plate 111, the upper frame plate 112, the lower frame plate 113, the left plate 114 and the right plate 115 may be formed integrally, such that a connection strength between the vertical plate 111, the upper frame plate 112, the lower frame plate 113, the left plate 114 and the right plate 115 is improved, thus improving a structure strength of the separator 10. Furthermore, a protection of the battery accommodating assembly 100 for the battery 101 is improved.

Alternatively, the front notch 141 may be formed in a front edge of each of the left plate 114 and the right plate 115, and the rear notch 151 may be formed in a rear edge of each of the left plate 114 and the right plate 115. In other words, the through hole may be formed in both left and right sides of the battery chamber, such that the electrode of the battery 101 can extend out of the battery chamber via a left through hole or a right through hole. The positions of the positioning hole 621 of the anti-explosion valve, the injection hole and the through hole for the electrode can be arranged according to the structure of the battery 101. A plurality of the front notches 141 are arranged and spaced from one another in the up-down direction, and a plurality of the rear notches 151 are arranged and spaced from one another in the up-down direction, i.e. a plurality of though holes are formed in both the left and right sides of the battery chamber.

In addition, when the power battery module 1000 works normally, a gap may be formed between a peripheral wall of the battery chamber and the battery 101, such that the battery 101 can be cooled by air within the power battery 1000. When there is an abnormal condition occurred in the battery 101 of the power battery module 1000, for example when the battery 101 is swollen, the gap between the peripheral wall of the battery chamber and the battery 101 can tolerate the deformation of the battery 101 in a thickness direction, thus improving the safety of the power battery module 1000.

An annular step 142 is disposed on a bottom wall of at least one of the front accommodating groove 14 and the rear accommodating groove. In an embodiment of the present disclosure, the annular step 142 is disposed on the bottom wall of each of the front accommodating groove 14 and the rear accommodating groove. By disposing the annular step 142, the bottom wall of each front accommodating groove 14 and the rear accommodating groove can be separated from an outer surface of the battery 101, thus ensuring the gap between peripheral wall of the battery chamber and the battery 101.

Alternatively, a surface of the bottom wall of at least one of the front accommodating groove 14 and rear accommodating groove is inclined downward from a periphery of the bottom wall to a center of the bottom wall. In an embodiment of the present disclosure, the surface of the bottom wall of each of the front accommodating groove 14 and rear accommodating groove is inclined downward from the periphery of the bottom wall to the center of the bottom wall, thus ensuring the gap between peripheral wall of the battery chamber and the battery 101. The surface of the bottom wall of each front accommodating groove 14 and rear accommodating groove may be a surface of the vertical plate 111.

In order to meet a requirement of safety and reliability, the separator 10 may be made of an engineering plastic and a composite material having a high strength, a high corrosion resistance, a great weather fastness, a good fire resistance and a high insulation property, such as PPO (Poly Phenylene Oxide), PP (Poly Propylene), PET (Polyethylene Glycol Terephthalate), ABS (Acrylonitrile Butadiene Styrene), PC (Poly Carbonate) or these materials embedded with metal therein. Thereby, the separator 10 according to embodiments of the present disclosure has the high strength and can protect the battery 101 effectively in abnormal conditions, such as a collision occurred to the power battery module 1000. For example, the separator body 11 may be formed by overall injection molding, and the metal may be embedded into these materials during the injection molding, so that the structure strength of the separator 10 is further improved. Moreover, the separator 10 may be demolded directly after the injection molding, so that it is convenient for manufacture and the cost is saved.

As shown in FIG. 12, a front step 118 is disposed at a front side edge of each of the upper frame plate 112 and the lower frame plate 113, and a rear step 119 is disposed at a rear side edge of each of the upper frame plate 112 and lower frame plate 113. When the plurality of separators 10 are assembled together, the front step 118 disposed at the front side edge of the upper frame plate 112 of one of the adjacent separators 10 is lapped with the rear step 119 disposed at the rear side edge of the upper frame plate 112 of the other one of the adjacent separators 10. Similarly, the front step 118 disposed at the front side edge of the lower frame plate 113 of one of the adjacent separators 10 is lapped with the rear step 119 disposed at the rear side edge of the lower frame plate 113 of the other one of the adjacent separators 10. Thus, an appearance of the battery accommodating assembly 100 is aesthetic, and adjacent separators 10 can be closely connected with each other. Moreover, the assembling efficiency of the power battery module 1000 is improved and the manufacture cost of the power batter module 1000 is reduced. In an embodiment of the present disclosure, the front step 118 may face downward and the rear step 119 may face upward, such that the corresponding front step 118 and rear step 119 can be fitted with each other better.

In an embodiment of the present disclosure as shown in FIG. 12, the front step 118 includes a first front step segment 1181 facing downwards and a second front step segment 1182 facing upwards, and the rear step 119 includes a first rear step segment facing upwards and corresponding to the first front step segment 1181 and a second rear step segment 1191 facing downwards and corresponding to the second front step segment 1182. Thereby, the adjacent separators 10 can be assembled with each other closer, so that a better assembly effect can be implemented. Moreover, by dividing the front step 118 and the rear step 119 into two segments respectively, the adjacent separators 10 can be assembled together and positioned with respect to each other due to a connection between the front step 118 and the rear step 119, and the connection between the adjacent separators 10 is stably.

In some embodiments of the present disclosure, a window 1111 may be formed in the vertical plate 111 to communicate the front accommodating groove 14 with the rear accommodating groove, i.e. the front accommodating groove 14 and the rear accommodating groove are communicated with each other. In other words, the vertical plate 111 is configured as a structure penetrated therethrough in the front-rear direction, thus saving a manufacture material and reducing the cost.

An insulating plate 16 or a heat conducting plate 17 may be disposed in the window 1111. By disposing the insulating plate 16, insulation between adjacent batteries 101 can be improved, so that a safety performance of the power battery module 1000 can be increased. By disposing the heat conducting plate 17, the radiation effect of the battery 101 within the battery chamber can be improved, thus, the safety performance of the power battery module 1000 can also be increased and a working life of the battery 101 can be lengthened.

Specifically, an insertion hole is formed in the upper frame plate 112, and an inserting groove aligned with the inserting hole is formed in the vertical plate 111, and the insulating plate 16 or the heat conducting plate 17 is inserted into the window 1111 via the insertion hole and the inserting groove. Thus, the insulating plate 16 or the heat conducting plate 17 may be mounted into the window 1111 more easily, and the structure is simple and easy to be assembled.

As shown in FIGS. 1-3, 6, 7, 9 and 11, in some embodiments of the present disclosure, a left cover 12 is disposed at a left end of the separator body 11; and a right cover 13 disposed at a right end of the separator body 11. With the left cover 12 and the right cover 13, the separator 10 and the battery 101 in the separator 10 may be protected well, thus further increasing safety performance and stability of the power battery module 1000.

As shown in FIGS. 1-3, 6, 7, 9 and 11, in some embodiments of the present disclosure, the left cover 12 and the right cover 13 can be formed with the separator body 11 integrally, such that a connection strength between the separator body 11 and the left cover 12 and the right cover 13 is improved, and a complex assembly process of the left cover 12 and the right cover 13 can be avoided, thus increasing an assembling speed.

Certainly, the present disclosure according to embodiments of the present disclosure is not limited to this, the left cover 12 and the right cover 13 may be detachably disposed on the separator 11 respectively. In other words, the separator 11, the left cover 12 and the right cover 13 may be produced independently, and then the left cover 12 and the right cover 13 are disposed on the separator 11 via a connection structure. Thereby, when one of the separator 11, the left cover 12 and the right cover 13 is damaged, it is just required to replace the corresponding one without replacing the whole assembly, thus facilitating maintenance and saving a cost thereof.

In an embodiment of the present disclosure as shown in FIG. 6, a snapping slot 117 may be formed in the separator body 11, and a clasp 134 snapped in the snapping slot 117 may be disposed on the left cover 12 and the right cover 13 respectively. By snapping the clasp 134 within the snapping slot 117, the left cover 12 and the right cover 13 are disposed on the separator body 11 respectively, such that the connections between the left cover 12 and the separator 10 and the right cover 13 and the separator 10 are simple. As shown in FIG. 6, the clasp 134 may be disposed on upper and lower ends of each of the left cover 12 and the right cover 13, such that the left cover 12 and the right cover 13 can be disposed on the separator body 11 stably.

In another embodiment of the present disclosure as shown in FIG. 11, a left end of the upper frame plate 112 extends leftward beyond the left plate 114 so as to form a left-upper extending part 1121, a left end of the lower frame plate 113 extends leftward beyond the left plate 114 so as to form a left-lower extending part 1131, a right end of the upper frame plate 112 extends rightward beyond the right plate 115 so as to form a right-upper extending part 1122, and a right end of the lower frame plate 113 extends rightward beyond the right plate 115 so as to form a right-lower extending part 1132. Moreover, the snapping slot 116 is formed in each of the left-upper extending part 1121, the left-lower extending part 1131, the right-upper extending part 1122 and the right-lower extending part 1132. Correspondingly, a left-upper clasp 121 snapped in the snapping slot 116 of the left-upper extending part 1121 and a left-lower clasp snapped in the snapping slot 116 of the left-lower extending part 1131 are disposed on a right surface of the left cover 12, and a right-upper clasp 131 snapped in the snapping slot 116 of the right-upper extending part 1122 and a right-lower clasp 132 snapped in the snapping slot 116 of the right-lower extending part 1132 are disposed on a left surface of the right cover 13. Therefore, it is more convenient to dispose the left cover 12 and the right cover 13 on the separator 10.

As shown in FIG. 11, the left-upper clasp 121 and the left-lower clasp may be disposed on a right surface of the left cover 12, and the right-upper clasp 131 and the right-lower clasp 132 may be disposed on a left surface of the right cover 13, such that a structure strength of each of the left-upper clasp 121, the left-lower clasp, the right-upper clasp 131 and the right-lower clasp 132 are improved.

Alternatively, the left cover 12 and the right cover 13 have a width in a front-rear direction larger than or equal to a width of the left plate 114 and the right plate 115 in the front-rear direction, and less than or equal to a width of the upper frame plate 112 and the lower frame plate 113 in the front-rear direction. When the left cover 12 and the right cover 13 have the width in the front-rear direction larger than the width of the left plate 114 and the right plate 115 in the front-rear direction, a gap may be formed between the left plates 114 of the adjacent separators 10 and between the right plates 115 of the adjacent separators 10, because the left cover 12 or the right cover 13 can cover the gap between the left plates 114 or between the right plates 115. When the left cover 12 and the right cover 13 have the width in the front-rear direction equal to the width of the left plate 114 and the right plate 115 in the front-rear direction, the left plates 114 of the adjacent separators 10 are closely contacted with each other and the right plates 115 of the adjacent separators 10 are closely contacted with each other, such that the left plate 114, the righty plate 115, the left cover 12 or the right cover 13 can protect the battery 101 properly.

In order to meet a requirement of safety and reliability of the left cover 12 and the right cover 13, the left cover 12 and the right cover 13 may be made of an engineering plastic and a composite material having a high strength, a high corrosion resistance, a great weather fastness, a good fire resistance and a high insulation property, such as PPO (Poly Phenylene Oxide), PP (Poly Propylene), PET (Polyethylene Glycol Terephthalate), ABS (Acrylonitrile Butadiene Styrene), PC (Poly Carbonate) or these materials embedded with metal therein. Thereby, the left cover 12 and the right cover 13 have the high strength, the high corrosion resistance and the good fire resistance, and can protect the battery 101 effectively in abnormal conditions, such as a collision occurred to the power battery module 1000.

As shown in FIGS. 1-3 and 7-9, in some embodiments of the present disclosure, the battery accommodating assembly 100 further includes a front plate 20. The front plate 20 defines a rear groove 21 in a rear side surface thereof. The rear groove 21 of the front plate 20 and the front accommodating groove 14 of the frontmost separator 10 of the plurality of separators 10 define the frontmost battery chamber. The front plate 20 is snapped with the frontmost separator 10, alternatively the front plate 20 may be snapped with the frontmost separator 10 via a snapping structure 60. The front plate 20 may not define a groove in a front side thereof, such that front plate 20 has a simple structure and is easy to be manufactured, thus saving materials and space.

Correspondingly, the battery accommodating assembly 100 further includes a rear plate 30. The rear plate 30 defines a front groove in a front side surface thereof. The front groove and the rear accommodating groove of the rearmost separator of the plurality of separators 10 define the rearmost battery chamber. The rear plate 30 is snapped with the rearmost separator 10, alternatively the rear plate 30 may be snapped with the rearmost separator 10 via the above snapping structure 60. The rear plate 30 may not define a groove in a rear side thereof, such that rear plate 30 has a simple structure and is easy to be manufactured, thus saving materials and space. In an embodiment of the present disclosure, the left cover 12 may be disposed at a left side of the front plate 20 and the right cover 13 may be disposed at a right side of the front plate 20, and the left cover 12 may be disposed at a left side of the rear plate 30 and the right cover 13 may be disposed at a right side of the rear plate 30, such that the front plate 20 and the rear plate 30 can be protected better.

Figure 2:
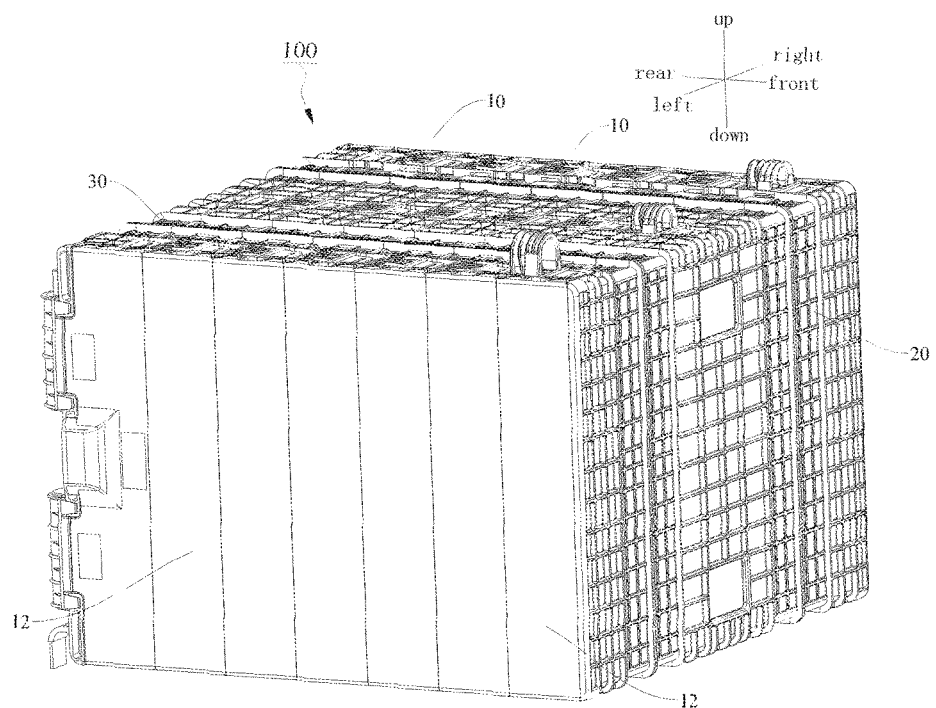
FIG. 2 is a schematic view of the power battery module shown in FIG. 1 from another direction.
Figure 18:
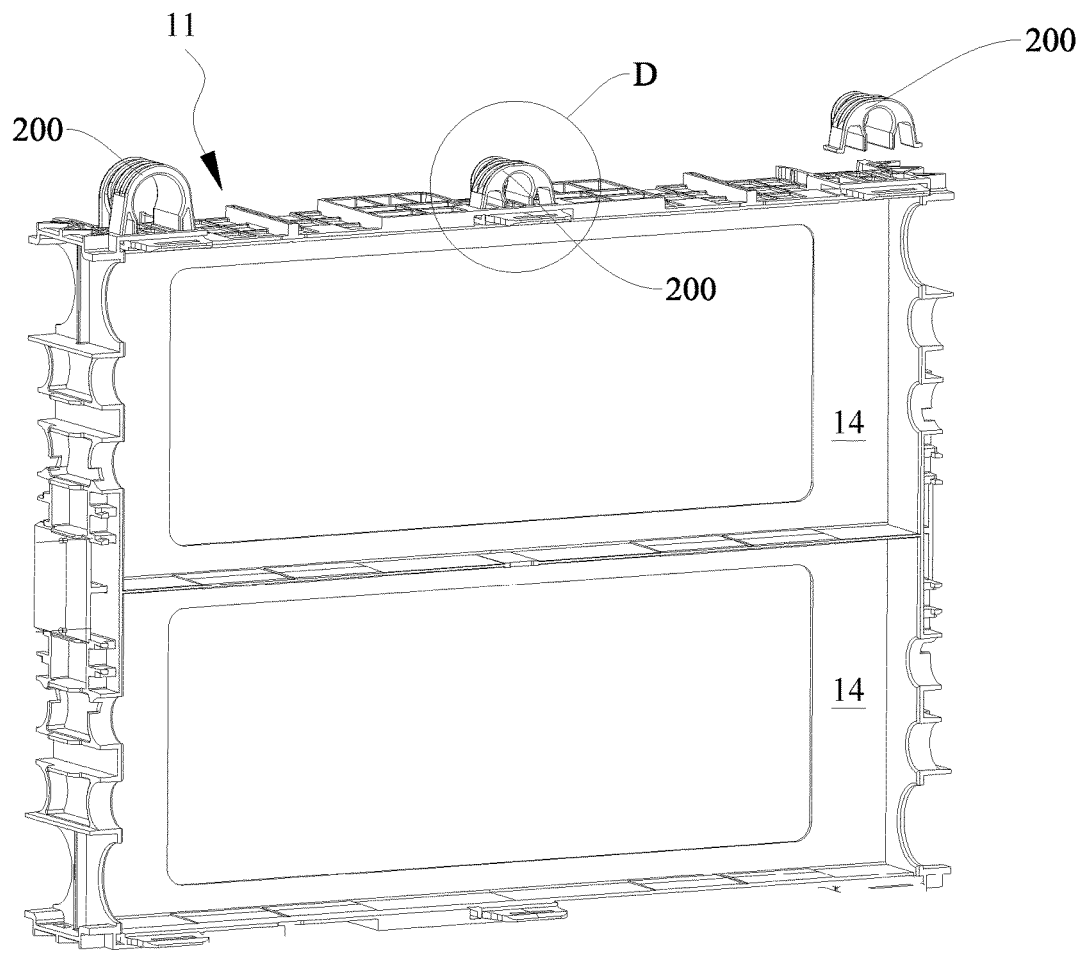
FIG. 18 is schematic view showing an assembling relationship between a cable snap-fit and a separator according to an embodiment of the present disclosure.
Figure 19:
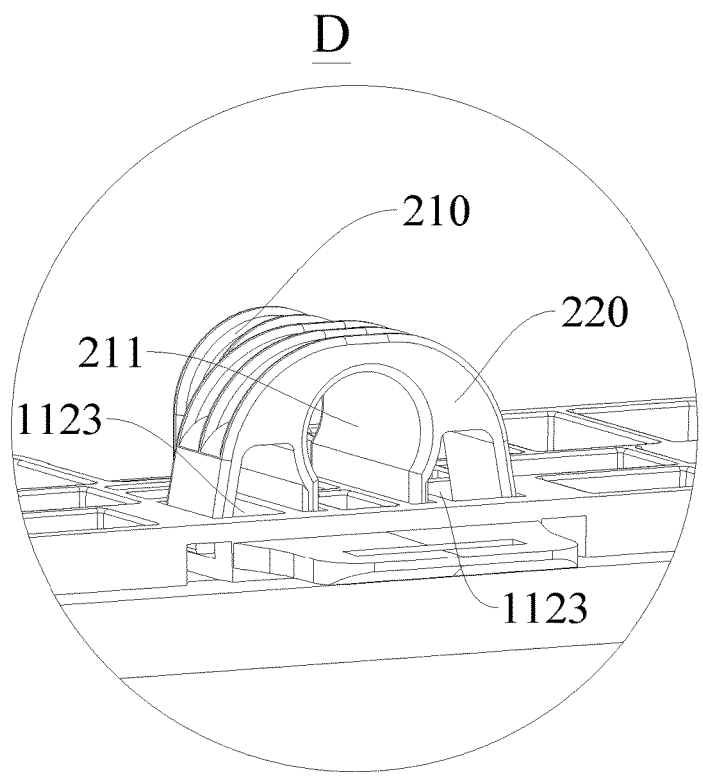
FIG. 19 is an enlarged view of region D shown in FIG. 18.

In some embodiments of the present disclosure, the snapping hole 1123 is disposed in at least one of upper and lower walls of the front accommodating groove 14 and the rear accommodating groove. In some other embodiments of the present disclosure, the snapping hole 1123 is disposed on at least one of a front side surface of the front plate 20 and a rear side surface of the rear plate 20. In some embodiments of the present disclosure, the battery accommodating assembly 100 further includes a cable snap-fit 200, as shown in FIG. 1, FIG. 2 and FIG. 18.

The cable snap-fit 200 may have a function of fastening cables or wires, that is, the cables or wires from the battery 101 may be limited on the power accommodating assembly 100 tidily and neatly via the cable snap-fit 200, then a reliability of the power battery module 1000 may be improved.

In some embodiments of the present disclosure, as shown in FIGS. 15-19, the cable snap-fit 200 includes a snap-fit body 210 and a snap-fitting portion 220.

The snap-fit body 210 is configured as a substantial arch shape, that is, in a width direction of the snap-fit body 210, a middle portion of the snap-fit body 210 protrudes upwards and two end portions of the snap-fit body 210 locates below the middle portion of the snap-fit body 210. The snap-fit body 210 defines a cabling channel 211 penetrating the snap-fit body 210 along a length direction of the snap-fit body 210. An opening portion 214 is formed at a lower end of the cabling channel 211. The cables or wires may be inserted into the cabling channel 211 from down to up and accommodated in the cabling channel 211. Then the cables or wires may be assembled more easily.

The snap-fitting portion 220 is disposed on exterior of the snap-fit body 210 and having a cable clasp 221 configured to be snapped in the snapping hole 1123 to fasten the snap-fit body 210 to the separator 10. Then the cable snap-fit 200 is detachably disposed on the separator body 10, such that cables or wires may be prevented from moving, and the structure is stable.

In some embodiments of the present disclosure, the snap-fitting portion 220 is disposed on two sides of the opening portion 214 respectively. Then the cable snap-fit 200 may be fastened to the separator 10 more stable. In some other embodiments of the present disclosure, two snap-fitting portions 220 are disposed on the two sides of the opening portion 214 respectively and symmetric to each other. That is, in the width direction of the snap-fit body 210, the two snap-fitting portions 220 are symmetric to each other, then the cable snap-fit 200 may be fastened to the separator 10 more stable.

With the cable snap-fit 200 according to the embodiments of the present disclosure, the cables or wires may be placed in the cabling channel 211 of the cable snap-fit 200 effectively and conveniently, the cables or wires may be prevented from moving in the process of use, frictions between the cables or wires and the structures may be reduced, so as to increase safety performance of the power battery module 1000. Moreover, with the snap-fitting portion 220 including a cable clasp 221 and disposed on the snap-fit body 210, the cable snap-fit 200 is detachably connected with installation body, then the cable snap-fit 200 are reusable, and it is easy to assemble and disassemble the cable snap-fit 200, and a maintenance cost and time may also be reduced.

Figure 15:
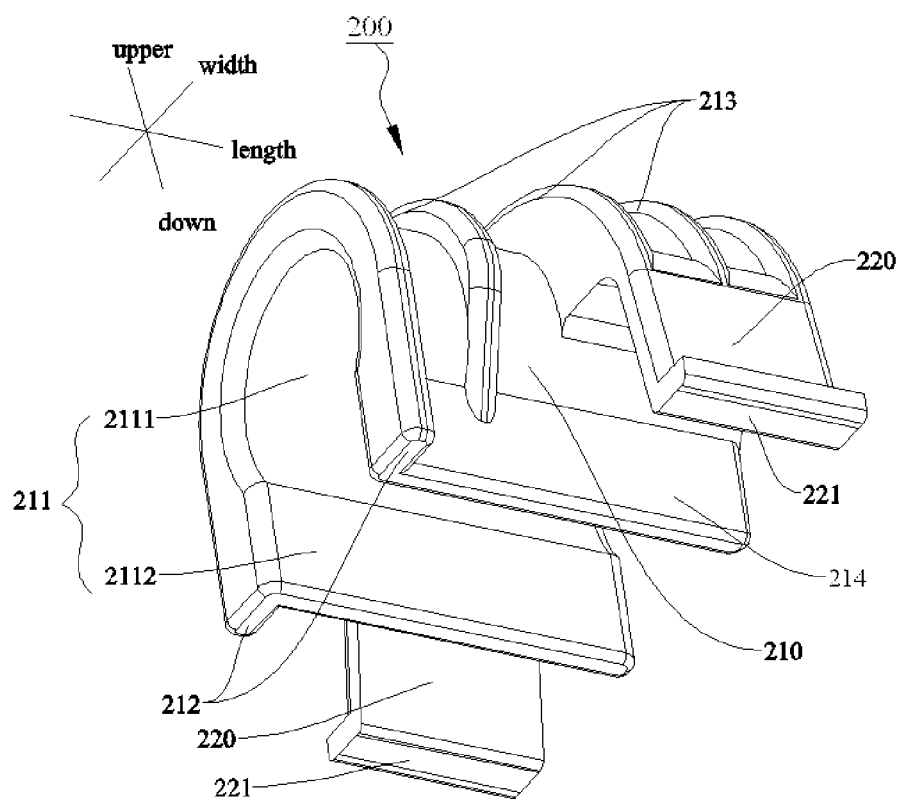
FIG. 15 is a perspective view of a cable snap-fit according to an embodiment of the present disclosure.
Figure 16:
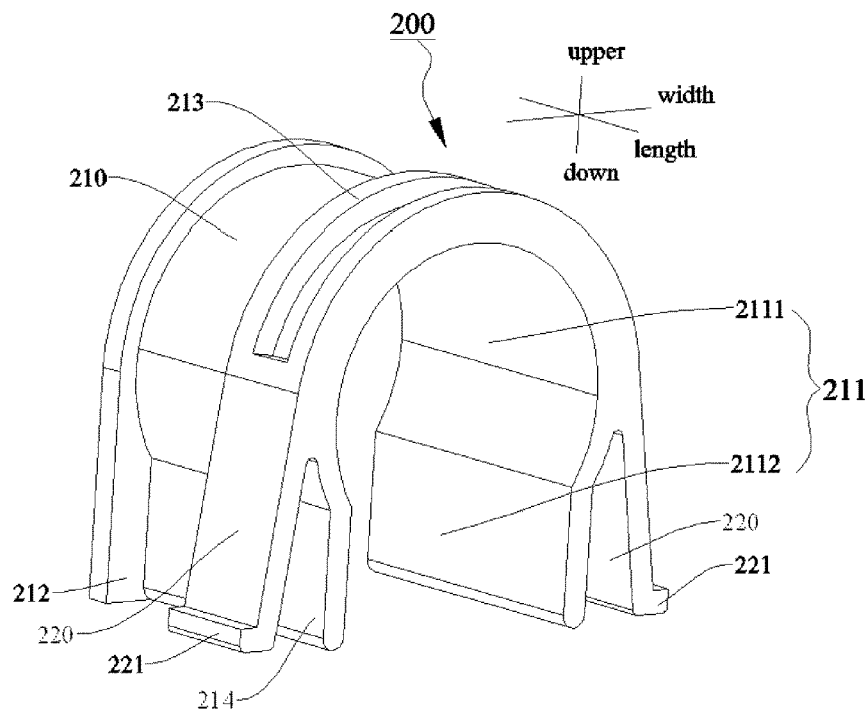
FIG. 16 is a perspective view of a cable snap-fit according to another embodiment of the present disclosure.
Figure 17:
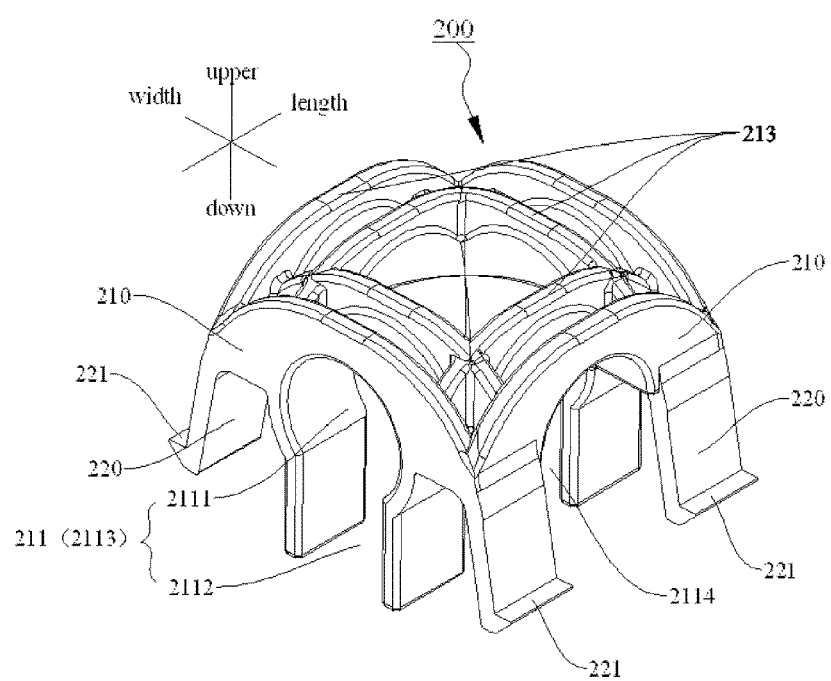
FIG. 17 is a perspective view of a cable snap-fit according to a further embodiment of the present disclosure.

In some embodiments of the present disclosure, the snap-fitting portion 220 includes a first end connected with the snap-fit body 210 and a second end having the cable clasp 221, as shown in FIGS. 15, 16 and 17, an upper end of the snap-fitting portion 220 is connected with the snap-fit body 210, the cable clasp 221 is disposed at a lower end of the snap-fitting portion 220. Then the cable snap-fit 200 may have a simple structure and the cable snap-fit 200 may be manufactured easily.

In some embodiments of the present disclosure, the cabling channel 211 includes: a cable accommodating portion 2111 configured to accommodate the cables; and a transition portion 2112 disposed at a lower end of the cable accommodating portion 2111 and communicated with the cable accommodating portion 2111. A lateral size of the transition portion 2112 is less than that of the cable accommodating portion 2111, and a lower end of the transition portion 2112 is open. Specifically, when assembling the cables or wires, the cables or wires may be received in the cable accommodating portion 2111 by inserting the cables or wires into the cable accommodating portion 2111 from lower end of the transition portion 2112.

The size of the cable accommodating portion 2111 may match with the size of cables or wires to accommodate the cables or wires. In some embodiments of the present disclosure, the size of the transition portion 2112 may be slightly less than the size of the cables or wires. Thus, when the cables or wires are accommodated in the cable accommodating portion 2111, the cables or wires may be prevented from being dropped off the cable accommodating portion 2111 under a relatively small force, then the cables or wires may be assembled and fixed in the cable accommodating portion 2111 more stable. The width of the transition portion 2112 cannot be too large, otherwise, the lamination function of the transition portion 2112 may not be formed, and the width of the transition portion 2112 cannot be too small, otherwise, the cables or wires cannot be inserted into the cable accommodating portion 2111.

In some embodiments of the present disclosure, a cross-section of the cable accommodating portion 2111 is configured as a circle shape, as shown in FIGS. 15, 16 and 17. Then the shape of the cable accommodating portion 2111 may match with the shape of the cables or wires, the cables or wires may be well accommodated in the cable accommodating portion 2111. In some embodiments of the present disclosure, a cross-section of the transition portion 2112 is configured as a rectangle shape, and a width of the transition portion 2112 is less than a diameter of the cable accommodating portion 2111. For example, the ratio of the diameter of the cable accommodating portion 2111 to the width of the transition portion 2112 may be 1.5:1.2, then the cables or wires may be pressed into the cable accommodating portion 2111 smoothly and easily from the transition portion 2112. In some embodiments of the present disclosure, the lateral size of the transition portion 2112 is gradually decreased in a direction from up to down, then the cables or wires may be limited in the cable accommodating portion 2111 better.

In some embodiments of the present disclosure, the cross-section of the cable accommodating portion 2112 is configured as a square shape, a cross-section of the transition portion 2111 is configured as a rectangle shape. Thus, the cross-section of the transition portion 2111 may be suitable for more actual requirements. The cross-section of the transition portion 2111 may also be configured as an oval shape, a polygon shape, an irregular shape, and so on, according to shape of the cables or wire and assembling requirements.

In some embodiments of the present disclosure, an internal surface of a side wall of the cable accommodating portion 2111 is configured as a smooth surface and a fillet is formed on an edge of the cable accommodating portion 2111. Thus, insulating layers on surface of the cables or wires may be prevented from being abraded due to a long term of friction between the cables or wires and the cable accommodating portion 2111, thus to improve a safety performance.

In some embodiments of the present disclosure, as shown in FIG. 17, the cabling channel 211 includes a first cabling channel 2113 and a second cabling channel 2114, the snap-fitting portion 220 is disposed on an external surface of a side wall of the first cabling channel 2113, and the first cabling channel 2113 and the second cabling channel 2114 are intersected in respective extending directions of the first and second cabling channels 2113, 2114. Then the cables or wires extend in the two directions may also be fastened, thus a range of application of the cable snap-fit 200 may be expanded and the cables or wires may extend in more various directions. In one embodiment of the present disclosure, the first cabling channel 2113 is vertical to the second cabling channel 2114, then the cabling channel 211 may be manufactured more easily.

In some embodiments of the present disclosure, the cable snap-fit 200 is fixed on at least one of the upper and lower walls of the front accommodating groove 14 and the upper and lower walls of the rear accommodating groove via the snapping hole 1123. In some other embodiments of the present disclosure, the cable snap-fit 200 is fixed on at least one of the front side surface of the front plate 20 and the rear side surface of the rear plate 30 via the snapping hole 1123. In one embodiment of the present disclosure, the cable snap-fit 200 disposed on the front side surface of the front plate 20 and the rear side surface of the rear plate 30 includes the first cabling channel 2113 and the second cabling channel 2114.

In some embodiments of the present disclosure, in the length direction, a size of the snap-fitting portion 220 is less than that of the snap-fit body 210, and an end face of the snap-fitting portion 220 is configured to flush with an end face of the snap-fit body 210. Thus, a cost rate of material may be reduced, and the cable snap-fit may have a simple and reasonable structure, and the snap-fitting portion 220 may be easily fixed to an installation body.

In some embodiments of the present disclosure, the snap-fitting portion 220 is configured as an arch shape that substantially same with a shape of the snap-fit body 210, a size of the snap-fitting portion 220 is larger than that of the snap-fit body 210 both in a width direction and in an up-down direction. That is, in the width direction, the size of the snap-fitting portion 220 is larger than that of the snap-fit body 210, and in the up-down direction, the size of the snap-fitting portion 220 is larger than that of the snap-fit body 210. In other words, the snap-fitting portion 220 is disposed on an exterior of the snap-fit body 210, the cable clasp 221 extends outwards in the width direction from the second end of the snap-fitting portion 220. Thus, the cable clasp 221 may outwardly inserted in a cable clasp groove in the installation body to improve connection strength and stability between the cable snap-fit 200 and the installation body.

The size of the cable clasp 221 of the snap-fitting portion 220 may be designed in consideration of connection strength and stability of the cable snap-fit 200, and conveniences of assembling the cable snap-fit 200. For example, if the size of the cable clasp 221 is too small, the drawing force of the cable clasp 221 is also small, then the connection strength between the cable snap-fit 200 and installation body may be low, and the connection between the cable snap-fit 200 and installation body may be unstable (that is, the cable clasp 221 may dropped off due to vibration); if the size of the cable clasp 221 is too large, it may be not easy to install the cable clasp 221, in addition, when the cable clasp 221 is repeatedly assembled, the cable clasp 221 may be broken. Therefore, in some embodiments of the present disclosure, an extended length of the cable clasp 221 is about 1 millimeter to about 3 millimeters to ensure the connection strength and stability of the cable snap-fit 200, then the cable snap-fit 200 may be easily assembled and disassembled easily, and the cable snap-fit 200 has a good strength and cannot be broken after repeatedly assembling.

As shown in FIG. 15 and FIG. 16, in some embodiments of the present disclosure, the cabling channel 211 includes a first end and a second end in the length direction. The snap-fitting portion 220 is disposed adjacent to the first end of the cabling channel 211, and a limiting flange 212 is disposed at the second end of the cabling channel 211. That is, the snap-fitting portion 220 and the limiting flange 212 are disposed on two end of the snap-fit body 210 in the length direction. With the limiting flange 212, a degree of freedom of the cable snap-fit 200 in the length may be limited to further improve an installation stability of the cable snap-fit 200.

In some embodiments of the present disclosure, a plurality of strengthening ribs 213 are disposed on outer surface of the snap-fit body 210 and outer surface of the snap-fitting portion 220. Thus, strength of the snap-fit body 210 and the snap-fitting portion 220 may be increased and a service life of the snap-fit body 210 and the snap-fitting portion 220 may be lengthened. In some embodiments of the present disclosure, the number of the strengthening rib 213 is 2-6.

In some embodiments of the present disclosure, the snap-fit body 210 and the snap-fitting portion 220 are formed integrally to increase connection strength between the snap-fit body 210 and the snap-fitting portion 220, therefore, the cable snap-fit 200 may have a stable structure and a long service life. Specifically, the snap-fit body 210 and the snap-fitting portion 220 may be formed by injection molding, after the snap-fit body 210 and the snap-fitting portion 220 are molded, the snap-fit body 210 and the snap-fitting portion 220 may be demolded directly, therefore, it is easily to manufacture the snap-fit body 210 and the snap-fitting portion 220, and the cost is lower.

In order to improve intensity, corrosion resistance and weather resistance of the cable snap-fit 200, the cable snap-fit 200 may be made of materials having a high strength, a high corrosion resistance, a great weather fastness, such as PPO (Poly Phenylene Oxide), ABS (Acrylonitrile Butadiene Styrene), PC (Poly Carbonate) or these materials embedded with metal therein.

Embodiments of the present disclosure also provide a power battery module 1000, which includes the battery accommodating assembly 100 mentioned above. With the battery accommodating assembly 100 according to the embodiments of the present disclosure, the battery 101 may be fixed in the battery chamber of the battery accommodating assembly 100 firmly and safely. Thus the power battery module 1000 may have a simple structure, a long service life and a high safety performance. In addition, the power battery module 1000 may be manufactured easily, and could be freely expanded according to actual needs.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A battery accommodating assembly, comprising a plurality of separators, wherein adjacent separators are detachably connected with each other via a snapping structure and define a battery chamber, the separator comprises a separator body, and the separator body comprises:
   a vertical plate;
   an upper frame plate disposed at a top edge of the vertical plate;
   a lower frame plate disposed at a bottom edge of the vertical plate;
   a left plate disposed at a left end of the vertical plate and comprising an upper end connected with the upper frame plate and a lower end connected with the lower frame plate; and
   a right plate disposed at a right end of the vertical plate and comprising an upper end connected with the upper frame plate and a lower end connected with the lower frame plate,
   wherein each of the front and rear accommodating grooves is defined by the vertical plate, the upper frame plate, the lower frame plate, the left plate and the right plate.

2. The battery accommodating assembly according to claim 1, wherein the snapping structure comprises:
   a snapping groove formed in one of the adjacent separators; and
   a snapping tongue disposed on the other of the adjacent separators and adapted to snap in the snapping groove to fasten the adjacent separators together.

3. The battery accommodating assembly according to claim 2, wherein a through-hole is formed in at least one of a left wall and a right wall of the battery chamber.

4. The battery accommodating assembly according to claim 3, wherein the separator body comprises a front portion and a rear portion, the front portion defines a front accommodating groove; a front notch is formed in at least one of a left wall and a right wall of the front accommodating groove, the battery chamber is defined by the front accommodating groove of one of adjacent separators and the rear portion of the other of the adjacent separators; and the through-hole is defined by the front notch of one of adjacent separators and the other of the adjacent separators.

5. The battery accommodating assembly according to claim 4, wherein the rear portion of the separator defines a rear accommodating groove, a rear notch corresponding to the front notch is formed in at least one of a left wall and a right wall of the rear accommodating groove, the battery chamber is defined by the front accommodating groove of one of adjacent separators and the rear accommodating groove of the other of the adjacent separators, and the through-hole is defined by the front notch of one of adjacent separators and the rear notch of the other of the adjacent separators.

6. The battery accommodating assembly according to claim 5, wherein the snapping groove is formed in one of front and rear edges of the upper frame plate, and the snapping tongue is disposed on the other one of the front and rear edges of the upper frame plate.

7. The battery accommodating assembly according to claim 5, wherein the snapping groove is formed in one of front and rear edges of the lower frame plate, and the snapping tongue is disposed on the other one of the front and rear edges of the lower frame plate.

8. The battery accommodating assembly according to claim 2, wherein the snapping tongue has a trapezoid shape.

9. The battery accommodating assembly according to claim 2, wherein a guiding slope is formed at an opening of the snapping groove.

10. The battery accommodating assembly according to claim 5, wherein a window is formed in the vertical plate to communicate the front accommodating groove with the rear accommodating groove.

11. The battery accommodating assembly according to claim 10, wherein an insulating plate or a heat conducting plate is disposed in the window.

12. The battery accommodating assembly according to claim 10, wherein an insertion hole is formed in the upper frame plate, an inserting groove aligned with the inserting hole is formed in the vertical plate, and the insulating plate or a heat conducting plate is inserted into the window via the insertion hole and the inserting groove.

13. The battery accommodating assembly according to claim 5, wherein the front notch is formed in a front edge of each of the left and right plates, and the rear notch is formed in a rear edge of each of the left and right plates.

14. The battery accommodating assembly according to claim 2, wherein the snapping structure comprises:
 a snap-fit groove formed in the separator; and
 a snap-fit pin having at least two mounting parts respectively fitted in the snap-fit grooves of at least two separators to connect the at least two separators.

15. The battery accommodating assembly according to claim 14, wherein the snap-fit pin further comprises a connection bridge, and two mounting parts are disposed at two ends of the connection bridge respectively and fitted in the snap-fit grooves of adjacent separators to connect the adjacent separators with each other.

16. The battery accommodating assembly according to claim 15, wherein the snap-fit groove has an opening, and the openings of the snap-fit grooves in the adjacent separators are aligned to each other to receive the connection bridge.

17. The battery accommodating assembly according to claim 1, wherein the separator is formed integrally.

18. The battery accommodating assembly according to claim 5, wherein an annular step is disposed on a bottom wall of at least one of the front and rear accommodating grooves.

19. A power battery module, comprising:
 a battery accommodating assembly comprising a plurality of separators, wherein adjacent separators are detachably connected with each other via a snapping structure and define a battery chamber, the separator comprises a separator body, and the separator body comprises:
  a vertical plate;
  an upper frame plate disposed at a top edge of the vertical plate;
  a lower frame plate disposed at a bottom edge of the vertical plate;
  a left plate disposed at a left end of the vertical plate and comprising an upper end connected with the upper frame plate and a lower end connected with the lower frame plate; and
  a right plate disposed at a right end of the vertical plate and comprising an upper end connected with the upper frame plate and a lower end connected with the lower frame plate,
  wherein each of the front and rear accommodating grooves is defined by the vertical plate, the upper frame plate, the lower frame plate, the left plate and the right plate, and
 a battery accommodated in a battery chamber of the battery accommodating assembly.

* * * * *